United States Patent
Zimmerman et al.

(10) Patent No.: US 6,526,131 B1
(45) Date of Patent: Feb. 25, 2003

(54) INITIATION OF COMMUNICATION BETWEEN NETWORK SERVICE SYSTEM AND CUSTOMER-PREMISES EQUIPMENT

(75) Inventors: Gary D. Zimmerman, Boise, ID (US); Terrence L. Skaggs, Boise, ID (US); Anthony J. Wiley, Bristol (GB); Brian W. McBride, Bristol (GB); David Banks, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/303,395

(22) Filed: Apr. 30, 1999

(51) Int. Cl.[7] .......................... H04M 11/00; H04L 12/66
(52) U.S. Cl. ......................... 379/106.09; 379/106.03; 379/106.05; 370/352
(58) Field of Search ................... 379/106.09, 106.03, 379/106.05; 370/352

(56) References Cited

U.S. PATENT DOCUMENTS

| | | | |
|---|---|---|---|
| 5,434,911 A | | 7/1995 | Gray et al. |
| 5,852,658 A | * | 12/1998 | Knight et al. .......... 379/106.03 |
| 5,995,601 A | * | 11/1999 | Garland et al. ........ 379/106.03 |
| 6,192,044 B1 | * | 2/2001 | Mack ......................... 370/352 |
| 6,219,409 B1 | * | 4/2001 | Smith et al. ............ 379/106.09 |
| 6,263,055 B1 | * | 7/2001 | Garland et al. ........ 379/106.05 |

FOREIGN PATENT DOCUMENTS

| | | |
|---|---|---|
| GB | 2 158 703 | 11/1985 |
| WO | WO 99/26529 | 6/1998 |
| WO | WO 99/30262 | 6/1999 |

* cited by examiner

Primary Examiner—Ahmad F. Matar
Assistant Examiner—Thjuan P Knowlin

(57) ABSTRACT

Customer premises equipment (11B) connected to a telephone line (13B), is arranged to be woken up remotely and then to initiate communication with a network-based service system. (20). In order to avoid the cost involved in having a dedicated phone line for the equipment, the equipment (11B) needs to be able to be woken up in a selective manner that does not have significant impact on the operation of other apparatus that may be connected to the same phone line (13B). Several different techniques are provided for waking up the equipment (11B) and initiating communication with the service system (20). In one embodiment, equipment wakeup is effected by a call with particular characteristics, the equipment (11B) once woken up calling a network access point (18) to establish communication with the service system (20). In another embodiment, a wakeup call is placed via a network access point (18) and the equipment picks up the call and uses it to establish network access. In other embodiments, the equipment is woken up by means of a wakeup indicator transmitted independently of a normal call on the line connected to the equipment, such as by signalling passed over the phone line or by radio paging.

15 Claims, 11 Drawing Sheets

INITIATION OF COMMUNICATION BETWEEN NETWORK SERVICE SYSTEM AND CUSTOMER-PREMISES EQUIPMENT

FIELD OF THE INVENTION

The present invention relates to remotely waking up customer premises equipment to cause the latter to initiate communication with a network-based service system.

BACKGROUND OF THE INVENTION

A number of applications are known of the general concept by which a party who wishes to communicate with another, first makes a telephone call to activate or "wakeup" communications apparatus, the initiating party then terminating its call to permit the latter apparatus to establish the required inter-party communication.

One application of this concept is where the initiating party calls a third-party service system which recognises the caller without picking up the call and interprets the call as a request to connect that party to a particular telephone number corresponding to the party with which the initiating party wishes to communicate. The third-party service system then sets up a call between the initiating party and the party at the particular telephone number. Generally, the motivation for such systems is the cost differential between outbound and inbound calls to the initiating party, such differentials being most conspicuous in relation to international calls. Systems of this type may infringe local telecommunication regulations in some countries, the regulations having been implemented to stop the unpaid use of telephone-network resources which arises from the initial call not being picked up (uncompleted calls are not paid for in most telephone networks).

Another example of use of a wakeup call to prompt communication initiation, is disclosed in U.S. Pat. No. 5,434,911 in relation to the remote reading of a utility meter by the utility company. The meter is connected to a normal telephone line and the utility company can wake up the meter by making a call to that line and allowing it to ring 16 times; the meter recognises such a call as an instruction to send a meter reading to the utility company and this it does by calling back the utility company at a predetermined time and transmitting the required data. Again, the motivation to have the meter call back rather than pick up the initial wakeup call is economic—in the United States outbound calls from domestic premises are generally free of charge whereas the utility company would pay for a completed call to the domestic premises. An alternative way of triggering the meter to call back is also described in situations where a call has already been established between the customer and utility company personnel—in this case, and assuming that the meter is connected to the same line as the customer telephone handset, the utility company personnel can wake up the meter by sending a predetermined tone signal down the open telephone line; again, the meter is arranged to call back the utility company with the required data.

It is also known to remotely wakeup a computer to initiate the set up of IP-based (Internet Protocol based) communication with it. In this case, the computer is connected to a dedicated telephone line via a modem. A user wishing to wake up the computer calls the computer and upon the latter answering, hangs up. The computer now calls a local internet access provider (IAP) and establishes a connection to the Internet. Next, the computer sends an e-mail to the user at a fixed IP address; this e-mail will contain the current IP address dynamically assigned to the computer by the IAP thereby enabling the user to send messages back to the computer. In a refinement, caller ID information is provided to the computer with the initial call and this information is used to determine which of several fixed IP addresses is called back by the computer.

However, none of the foregoing examples provides a way of remotely waking up customer premises equipment to cause it to initiate communication with a network-based service system which is both inexpensive and minimises inconvenience. In particular, none of the foregoing examples satisfactorily handles the conflict between having the equipment use the same line as other apparatus (such as a telephone handset) whilst minimising annoyance due false pick up by the equipment.

It is an object of the present invention to provide a method and apparatus providing a better compromise between cost and convenience.

SUMMARY OF THE INVENTION

According to the present invention, there is provided a method of initiating communication between a service system connected to an IP network at a known address, and customer-premises equipment connected to a telephone line to which other customer-premises apparatus may also be connected, the telephone line being part of a telephone system through which said equipment can connect to a network access point to access said IP network with an address that is assigned each time connection to the network is established; said method comprising the steps of:

(a)—initiating, from the service system, the placing of a wakeup call to said telephone line, the wakeup call being a ringing telephone call with particular characteristics;

(b)—monitoring said telephone line at the customer-premises equipment and upon detecting a said wakeup call by its particular characteristics, accessing said IP network from the equipment by placing a telephone call through telephone system to the network access point and establishing an IP link between the equipment and said network access point;

(c)—establishing contact from the customer premises equipment over the IP network with the service system at said known address; and (d)—passing from the customer-premises equipment to the service system, the current network address of said equipment whereby the equipment and service system, knowing each others network addresses, can intercommunicate.

Advantageously, the wakeup call is identified by means of a characteristic caller ID or distinctive ring, or, in the event that the call is picked up, by rapid call termination, by an in-band signal, or by a predetermined period of silence. All of these call characteristics permit the customer premises equipment to recognise wakeup calls on a line also receiving normal telephone calls.

According to another aspect of the present invention, there is provided a method of initiating communication between a service system connected to an IP network at a known address, and customer-premises equipment connected to a telephone line to which other customer-premises apparatus may also be connected, the telephone line being part of a telephone system through which said equipment can connect to a network access point to access said IP network with an address that is assigned each time connection to the network is established; said method comprising the steps of:

(a)—initiating, from the service system, the placing of a wakeup call passing from said network access point to said telephone line, the wakeup call being a ringing telephone call with particular characteristics;

(b)—monitoring said telephone line at the customer-premises equipment and upon detecting a said wakeup call by its said particular characteristics, accessing said IP network from the equipment by using the connection established by said wakeup call to set up an IP link through the telephone system between the equipment and said network access point;

(c)—establishing contact from the customer premises equipment over the IP network with the service system at said known address; and (d)—passing from the customer-premises equipment to the service system, the current network address of said equipment whereby the equipment and service system, knowing each others network addresses, can inter-communicate.

Again, the wakeup call can be identified by means of a characteristic caller ID or distinctive ring, or, in the event that the call is picked up, by an in-band signal, or by a predetermined period of silence.

According to a further aspect of the present invention, there is provided a method of initiating communication between a service system connected to an IP network at a known address, and customer-premises equipment connected to a telephone line to which other customer-premises apparatus may also be connected, the telephone line being part of a telephone system through which said equipment can connect to a network access point to access said IP network with an address that is assigned each time connection to the network is established; said method comprising the steps of:

(a)—initiating, from the service system, the sending of a wake-up indicator over said telephone line to the customer-premises equipment, the wakeup indicator being transmitted independently of a ringing telephone call;

(b)—monitoring said telephone line at the customer-premises equipment and upon detecting said wake-up indicator, accessing said IP network from the equipment by placing a telephone call through telephone system to the network access point and establishing an IP link between the equipment and said network access point;

(c)—establishing contact from the customer premises equipment over the IP network with the service system at said known address; and (d)—passing from the customer-premises equipment to the service system, the current network address of said equipment whereby the equipment and service system, knowing each others network addresses, can inter-communicate.

The wakeup indicator is, for example, a VMWI-based indicator.

According to a still further aspect of the present invention, there is provided a method of initiating communication between a service system connected to an IP network at a known address, and customer-premises equipment connected to a telephone line to which other customer-premises apparatus may also be connected, the telephone line being part of a telephone system through which said equipment can connect to a network access point to access said IP network with an address that is assigned each time connection to the network is established; said method comprising the steps of:

(a)—initiating, from the service system, the sending of a wake-up indicator over a predetermined communications channel independent of said telephone line to the customer-premises equipment;

(b)—monitoring said predetermined channel at the customer-premises equipment and upon detecting said wake-up indicator, accessing said IP network from the equipment by placing a telephone call through telephone system to the network access point and establishing an IP link between the equipment and said network access point;

(c)—establishing contact from the customer premises equipment over the IP network with the service system at said known address; and (d)—passing from the customer-premises equipment to the service system, the current network address of said equipment whereby the equipment and service system, knowing each others network addresses, can inter-communicate.

The predetermined communications channel is, for example, a radio paging channel.

All of the foregoing methods of the invention can advantageously be used in initiating communication over an IP network between a first end system and a second end system using the services of an intermediary service system connected to the network at a known address, the second of said end systems being the customer-premises equipment referred to in the preceding paragraphs. More particularly, communication between the end systems is initiated by the steps of:

(a)—passing from the first end system, over the network, to said intermediary system, a network address through which the first end system can be contacted, (b)—establishing contact between the intermediary system and the second end system over the network according to one of the foregoing methods of the invention; and (c)—passing from the intermediary system, over the network, to one said end system, the network address of the other said end system, and passing the network address of said one end system, from said one end system or said intermediary system to the said other end system whereby the end systems, knowing each others network addresses, can inter-communicate.

BRIEF DESCRIPTION OF THE DRAWINGS

A communications service method and arrangement embodying the invention will now be described, by way of non-limiting example, with reference to the accompanying diagrammatic drawings, in which.

BEST MODE OF CARRYING OUT THE INVENTION

Figure 1:
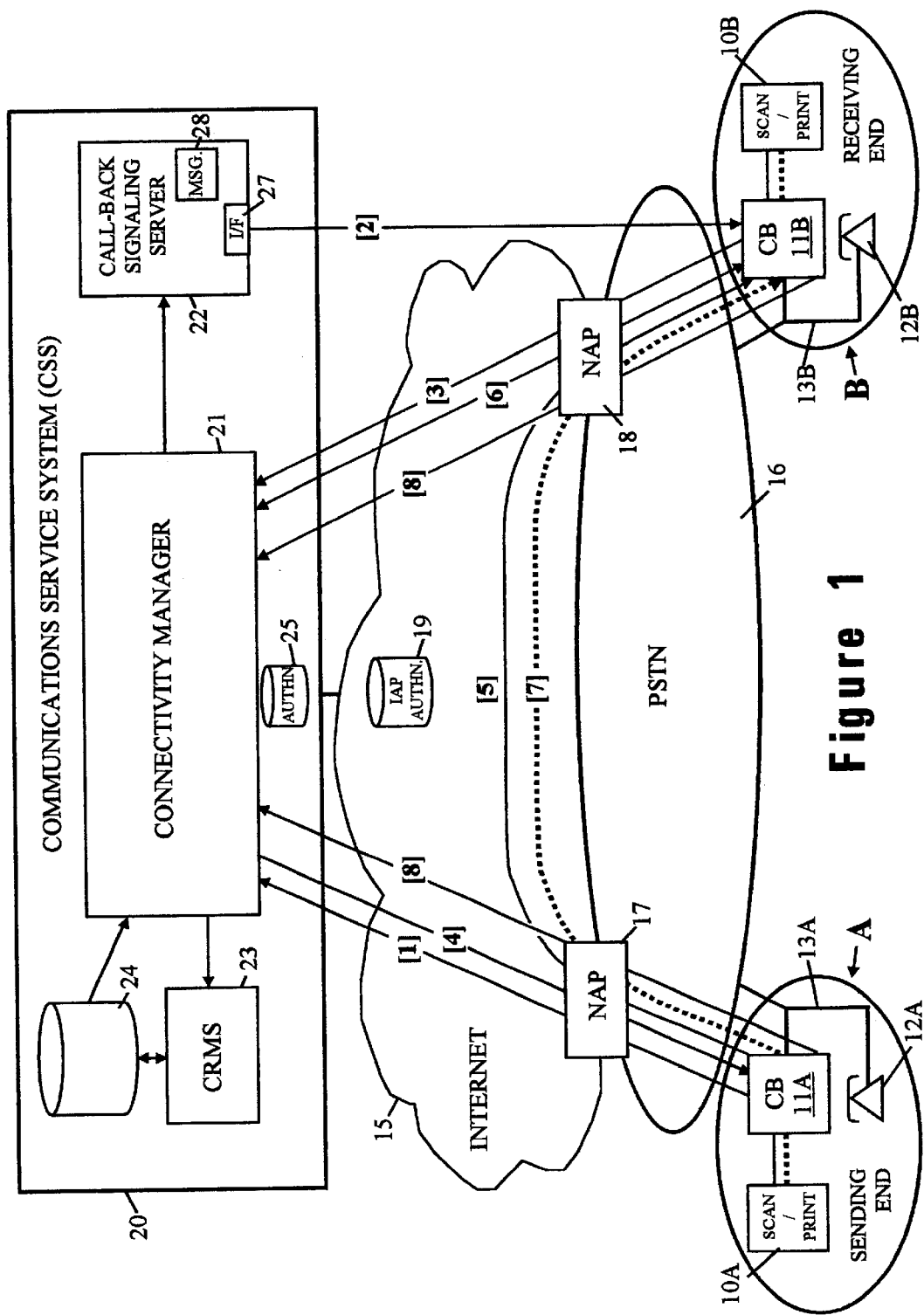
FIG. 1 is a diagram illustrating the overall form and operation of the communications arrangement and showing two end systems placed in communication with the aid of services provided by a communications service system.

FIG. 1 shows an arrangement embodying the invention by which two end systems A, B (for example, at domestic premises) can be set up to communicate with each other over the internet 15 or other packet switched data network. In the present case, both end systems A and B have internet access via dialup connections through the public switched telephone network PSTN 16.

For ease of description, both end systems A and B are shown as having the same items of equipment and the same reference numbers are used for corresponding items in the two end systems, suffixed by A or B as appropriate to indicate the end system concerned where it is desirable to make this distinction. More particularly, each end system A, B comprises a standard analogue-line telephone installation with telephone line 13A, 13B and telephone 12A, 12B; a combined scanner/printer device 10A, 10B; and a connectivity box 11A, 11B connected between the telephone line 13 and scanner/printer device 10. The connectivity boxes 11A, 11B are responsible for establishing a communication channel across the internet to enable the devices 10A, 10B to exchange data. Each connectivity box includes an electronic address book enabling a user to specify the end system with which it is desired to communicate.

In the following description, it will be assumed that the user of end system A (user A), wishes to send a drawing to the user of end system B (user B); in other words, the drawing is to be scanned in by device 10A, sent over the internet 15 from end system A to end system B, and printed out by device 10B. In this context, end system A is the sender system and end system B the receiver system and use of the terms "sender" and "receiver" below are to be interpreted accordingly. However, it should be understood that once communication has been established between the end systems A and B, data flow can be in either or both directions and designating end system A as the sender and end system B as the receiver is merely done to facilitate description of the FIG. 1 arrangement.

The connectivity box (CB) 11A of end system A can connect to the internet 15 or other IP network through the local Network Access Point (NAP) 17 of a network access service provider (NASP), CB 11A establishing a dialup connection through the PSTN with NAP 17 and using PPP ("Point to Point Protocol") to enable IP packets to be transferred to/from CB 11A. Similarly, CB 11B can connect to its local NAP 18 over a PPP link to gain internet access. As is well known, dialup internet access achieved through local NAPs generally involves the dynamic assignment of IP addresses to the end system concerned in terms of its presence on the internet. In other words, each NAP 17,18 will assign the end system A, B respectively an IP address taken from its respective pool of addresses at the time that internet access is required, this address being returned to the pool once the access session is terminated. There will generally be no relation between the IP addresses assigned to an end system from one internet access session to the next.

In the present arrangement, it is assumed that the same NASP controls both NAP 17 and NAP 18. This NASP runs an authentication server 19 for authenticating users by username and password (for example, in accordance with the RADIUS standard). It is also possible for each NAP 17,18 to be controlled by a different NASP, with each NASP running its own authentication server for authenticating users.

User A, who may be quite unaccustomed to technical devices, faces two main problems when wanting to send a drawing to user B. Firstly, end system B will generally not be connected to the Internet at that moment, and secondly, neither end system knows a priori the IP address of the other because these addresses are dynamically assigned at connection time. To facilitate the initiation of communication between end systems A and B, an intermediary is provided in the form of communications service system (CSS) 20 which has a permanent internet presence at a known IP address. CSS 20 provides its connectivity services to its subscribers (end system users who have gone through a registration and CB configuration process).

CSS 20 comprises a connectivity manager 21 for exchanging messages with the end systems A and B over the internet, a call-back signalling server (CBSS) 22 by means of which the connectivity manager 21 can wake up an end system that is not currently connected to the internet, and a customer record management system (CRMS) 23 connected both to the connectivity manager 21 and to a customer database 24 holding customer details including billing data. The connectivity manager 21 holds an in-memory database of subscribers giving, for each subscriber, operational details including a globally-unique name for the subscriber, the subscriber's telephone number, and any rules a subscriber may specify limiting who should be allowed to contact them and the times of day when communications are permitted. The CSS 20 also has its own authentication server 25 that communicates with the NASP authentication server 19.

It may be noted that the entity running CSS 20 and providing the connectivity service (the "connectivity service provider" CSP), will generally have contracted with the NASP running the NAPs 17, 18 for internet access and bandwidth resources so that the end users A and B need not separately contract with NASP in addition to their service contracts with the CSP. In this case, the CSP will wish to meter data transfer between its subscribers even though, as will be seen, the data being transferred does not pass through the communications service system CSS 20.

The general operation of the FIG. 1 arrangement is as follows:

[1]—User A puts a drawing to be sent in the scanner of device 10A, selects user B from the address book in CB 11A, and presses a "send" button on CB 11A. CB 11A dials NAP 17 to get internet access (this process includes user authentication) and then connects to CSS 20 and informs the connectivity manager 21 that end system A wishes to send data to user B.

[2]—Connectivity manager 21 looks up the operational details of user B to determine if B is willing to receive communications from user A at the current time. Assuming this check is passed, connectivity manager 21 now passes the telephone number of user B to the call-back signalling server 22 which makes a wakeup telephone call to end system B.

[3]—In a manner to be described hereinafter, CB 11B recognises the wakeup call without answering it. CB 11B then calls its NAP 18 and establishes internet access (again, this involves authentication). CB 11B next connects to CSS 20 and informs the connectivity manager 21 that end system B is now on line.

[4]—Connectivity manager 21 by this time knows the current IP addresses of both end systems and proceeds to tell CB 11A the IP address for reaching end system B. It also tells CB 11A the job number that the connectivity manager has allotted to this transfer between end systems A and B.

[5]—CB 11A now sends a message direct to CB 11B over the internet to set up a data transfer; this message includes the job number as well as the IP address of end system A and the name of user A.

[6]—CB 11B, on receiving the data-transfer message from CB 11A, verifies with the connectivity manager 21 that the parameters sent to it by CB 11A (job number, IP address and user name) are as expected before proceeding further with the data transfer.

[7]—Data transfer is then initiated with the drawing to be sent being scanned in and data sent from device 10A, through CB 11A, NAP 17, the internet 15, NAP 18, and CB 11B, to device 10B where the drawing is printed out. This data transfer is shown by the bold dotted line in FIG. 1.

[8]—When data transfer is complete, both end systems A,B send metering data (for example, number of pages or bytes sent/received) to connectivity manager 21 which instructs CRMS 23 to record this information against the job number in the billing record of user A and/or B. Thereafter, both end systems disconnect form the connectivity manager 21 and terminate their internet accesses.

It will be appreciated that the foregoing does not identify all messages exchanged and a more detailed description of the messages exchanged will be given hereinafter with reference to FIG. 10.

Connectivity Box

Figure 2:
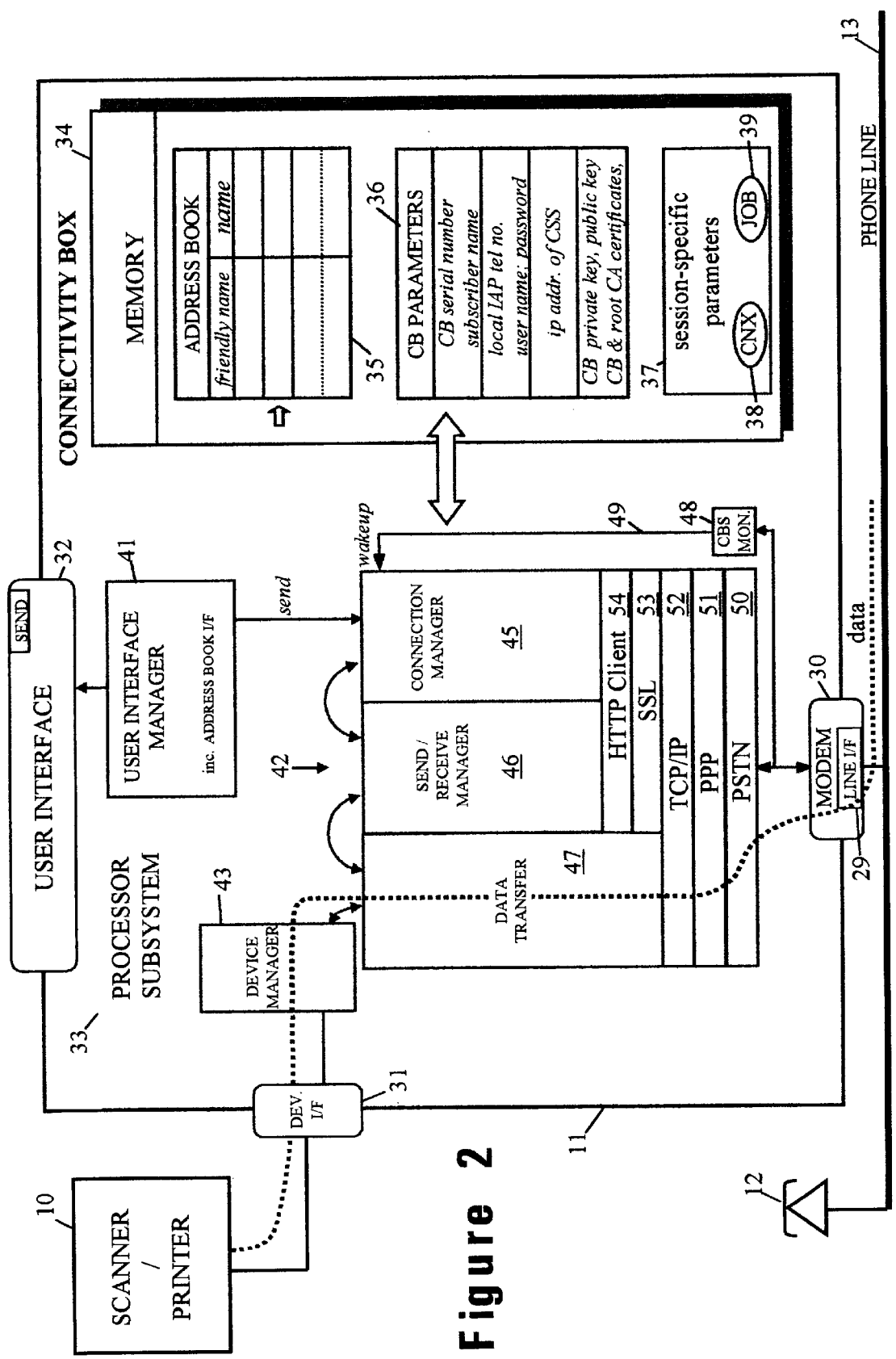
FIG. 2 is a functional block diagram of a connectivity box provided in each end system of FIG. 1.

FIG. 2 illustrates the form of the connectivity boxes 11. CB 11 has three external interfaces, namely modem 30 providing an interface to telephone line 13 through line interface circuitry 29, peripheral connect interface 31 (for example, a USB interface) providing connection to device 10, and user interface 32 comprising an LCD display panel and keypad (including a "send" button). Internally, CB 11 is constituted by a processor-based system formed by a processor subsystem 33 and memory 34 (the latter being a combination of volatile and non-volatile memory modules).

Memory 34 stores an address book 35 listing parties that a user may want to contact by a friendly name (such as "Uncle Jo") and a corresponding globally-unique name (such as "jo12345678"); a user may select a party to send to by using the user interface 32 to browse the address book in terms of the friendly names. The contents of the address book are also held by the connectivity manager 21. How the address book of CB 11 and connectivity manager 21 are coordinated on an on-going basis will not be described herein as it does not form part of the present invention; for present purposes it is sufficient to appreciate that the address books are co-ordinated (most simply, this could be done on a once off basis by manual data input into both at the time a user first subscribes to the connectivity service). However co-ordination is achieved, it will generally be the CSS 20 that specifies the globally-unique names ("globally-unique" in respect of all connectivity service subscribers) as the CSS is best placed to determine the required uniqueness.

Memory 34 also stores several CB parameters 36 which are either fixed or only likely to change infrequently. These parameters include:

unique serial number of the CB and the globally-unique name of the subscriber;

telephone number of local NAP, and user name and password for authentication when establishing internet access through that NAP;

IP address of CSS 20;

encryption data for establishing secure communication with CSS 20 (in the present embodiment SSL is used and the encryption data comprises the CB private key and public keys, certificates linking the CB public key respectively with the subscriber globally-unique name and with the CB serial number, this certificate being signed by an appropriate root certificate authority CA which may be the CSS itself, and a certificate for the root CA).

Memory 34 also stores a number of parameters that are primarily only relevant to a current session of communication. These parameters 37 include the IP address assigned to the CB for the current internet access session, the status of the connection between the CB and the connectivity manager 21, the job number allocated by the CSS for the current data transfer, and the IP address of the remote end system and name of the associated user. In fact, both the status of the connection to the connectivity manager 21, and the status of the data-transfer job can conveniently be tracked in the CB by storing, on an on-going basis, corresponding connection and job items 38, 39 that respectively hold the current state of the connection and job, this state being "idle" when the CB is inactive.

The processor subsystem 33 provides, under program control, specific functionality represented in FIG. 2 by:

user interface manager 41 for monitoring and controlling the user interface 32 to permit a user to select an intended receiving party by "friendly name" from the address book, then to initiate sending, a protocol stack 42 for controlling communication setup and data transfer through the modem 30, each protocol layer of the stack implementing the message formats and behaviours defined by the corresponding protocol specification (the behaviours being generally defined in terms of state machines), device interface manager 43 for managing data transfer to/from the device 10, and a call-back signalling (CBS) monitor 48 for monitoring telephone line 13 via the modem 30 to determine receipt of a wakeup call.

The protocol stack 42 comprises three application-level protocol layers 45–47 running on top of basic communication protocol layers. These basic communication protocol layers comprise a PSTN layer 50 for controlling the modem 30 to make calls over the telephone line 13 to NAP 17/18, a PPP layer 51 for establishing a mechanism for IP packet exchange over the phone line with the NAP 17/18, a TCP/IP layer 52 for providing reliable transport and network services, an SSL layer 53 for secure communication with the CSS 20, and an HTTP Client layer 54 for carrying application layer transaction messages in HTTP messages.

The three illustrated application-level protocol layers are a connection manager protocol layer 45 (referred to below as the connection manager 45), a send/receive manager protocol layer 46 (referred to below as the send/receive manager 46), and a data transfer protocol layer 47. The connection manager 45 and send/receive manager 46 each sit on top of the HTTP and SSL layers 54, 53 and effect secure transactions with peer protocol layers at the connectivity manager 21 of the CSS 20, each transaction being in the form of a request message and a corresponding response message with each request being carried in an HTTP POST/GET message addressed to a URL specific to the transaction type.

Figure 3:
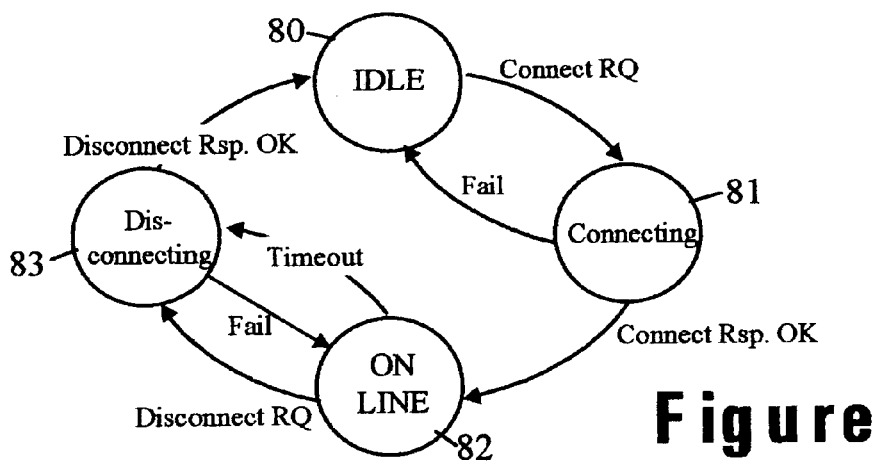
FIG. 3 is a state machine illustrating the behaviour of a connection manager of the FIG. 2 connectivity box.

The connection manager 45 manages, at the CB, the setting up and termination of a connection between the CB and the connectivity manager 21, the status of this connection being stored in memory item 38 and used as state information for the connection manager 45. The main transactions of the connection manager protocol are CONNECT and DISCONNECT. The connection manager 45 operates in accordance with the FIG. 3 connection state machine, the four states of which represent the possible states of the connection between the CB and connectivity manager 21. More particularly, when the CB is inactive, the connection state is "Idle" (state 80); if now the connection manager 45 is triggered to set up a communication channel to the connectivity manager 21, it sends a CONNECT Request to the latter (containing the current IP address of the CB on the internet and the globally-unique name of the subscriber) and the connection state machine thereupon transits to a Connecting state 81. (It will be appreciated that the issuing of a CONNECT Request by the connectivity manager 45 causes the lower layers of stack 42 to take all the necessary steps to dial NAP 17/18, establish a PPP link, and set up a secure link over the internet with CSS 20 over which the CONNECT Request can be passed to the connectivity manager 21). In due course, the connection manager 45 receives a CONNECT Response which will indicate whether or not a subscriber-service connection with the connectivity manager 21 has been granted; if a connection is granted, the "On Line" state 82 is entered and otherwise the Idle state 80 is re-entered. The next change results either from the connection manager 45 sending a DISCONNECT Request to the connectivity manager 21 in response to job termination, or from the expiry of a timeout period; in both cases, the Disconnecting state 83 is now entered. If a DISCONNECT Response is then received back from the connectivity manager 21 confirming the disconnection, the Idle state 80 is re-entered; however, if the DISCONNECT Response does not confirm disconnection, the On-Line state 82 is resumed.

Figure 4:
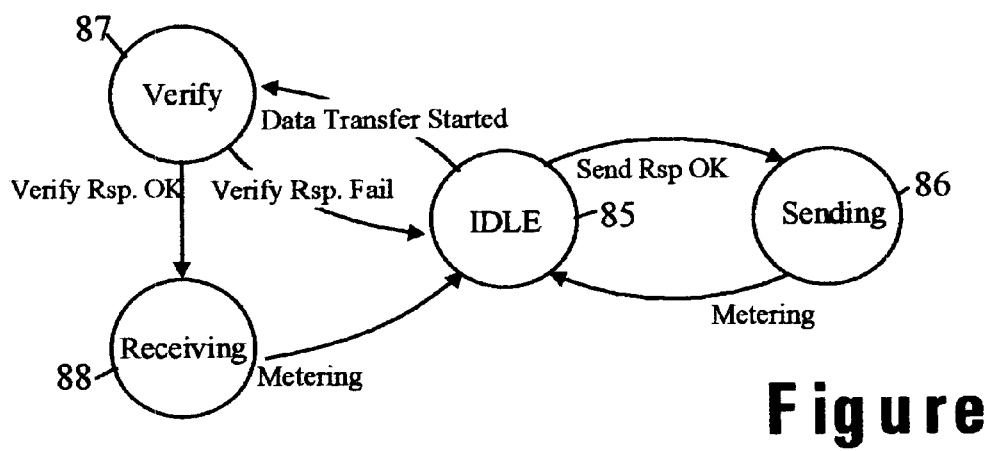
FIG. 4 is a state machine illustrating the behaviour of a send/receive manager of the FIG. 2 connectivity box.

The send/receive manager 46 is involved in the initiation of contact between the end systems and the metering of the data transfer between these systems; the main transactions of the protocol 46 are SEND (used by the sending system), VERIFY (used by the receiving system) and METERING. The send/receive manager 46 is intimately concerned with the progress of the current "job" as identified by the job number supplied by the CSS 20, the status of the job being stored in memory item 39 and used as state information for the send/receive manager 46. The send/receive manager 46 operates in accordance with the FIG. 4 connection state machine, the four states of which represent the possible states of the data transfer job being handled by the CB. More particularly, when the CB is inactive, the state of the data-transfer job is Idle (state 85). If now a user initiates a data transfer session (so that the CB is in a sending system), the send/receive manager 46 will, upon establishment of a connection with the connectivity manager 21, issue a SEND Request containing the globally-unique name of the intended receiving party. If the SEND Response received back from the connectivity manager 21 gives the go ahead to proceed with the data transfer, the job is set in a Sending state 86. At the end of data transfer, the send/receive manager sends a METERING message (no response expected) to the connectivity manager 21 with metering data, this message also indicating whether the data transfer was successful. The state of the job transits from its Sending state 86 back to its Idle state 85.

It is also possible for the send/receive manager to send interim METERING messages during the course of data transfer and, in this case, the message does not include an indication regarding whether or not the data transfer was successful and the job remains in its Sending state 86.

Where the CB is part of the receiving end system, the state of the job at the CB transits from the Idle state 85 to a Verify state 87 upon receipt by the CB of the first data transfer message (a transfer set up message) from the sending end system. In the verify state, the send/receive manager 46 exchanges VERIFY Request and Response messages with the connectivity manager 21; the job state will pass to Receiving (state 88) if the data transfer is confirmed by the connectivity manager, otherwise the Idle state is re-entered. When the job is in its Receiving state, the send/receive manager 46 effects one or more METERING transactions with the connectivity manager 21, the last of these transactions changing the job state back to Idle (state 85).

The data transfer protocol layer 47 sits on top of the TCP/IP layer and is responsible for data transfer with its peer in the remote CB. The data transfer protocol layer 47 communicates with the device interface manager 43 to control the flow of data through the CB to/from the device 10. The path taken by data being transferred to/from the device 10 is illustrated by the bold dotted line in FIG. 2. Any suitable data transfer protocol can be used and further description will not be given herein.

Figure 5:
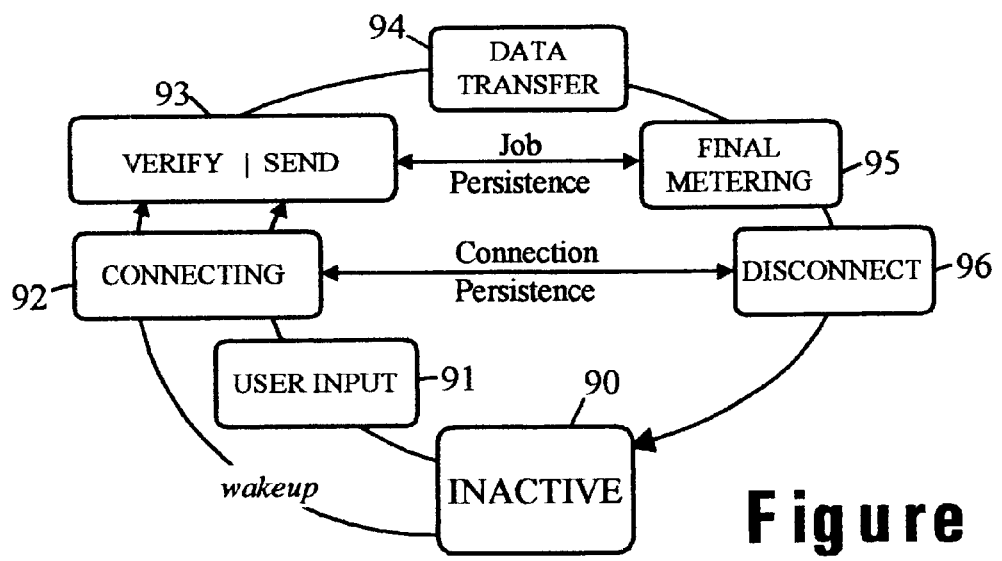
FIG. 5 is a diagram of the main operational phases of the FIG. 2 connectivity box.

Having described individually the main elements of the CB 11, the operating phases of the CB 11 as a whole will now be described with reference to FIG. 5 for the case of successful connection and data transfer between end systems (it should be noted that these phases are not "states" of the CB 11 as such). Starting from an inactive condition 90 of the CB 11 (both the connection and job being in their Idle states), the connection manager 45 is triggered to initiate a connection with the CSS 20 (phase 92) by either:

a user selecting a receiving party using the user interface 32 (phase 91) to access the address book 35 with the aid of the interface manager 41, and pressing "send"—in this case, the CB is part of the sending end system; or the CBS monitor 48 recognising a wakeup call—in this case, the CB is part of the receiving end system.

After a connection to the CSS 20 is established, the CB 11 will next enter the send/verify phase 93. Where the CB 11 is part of the sending system, this happens immediately the connection to the CSS 20 is established, the connection manager 45 recognising that it is part of the sending system (as a receiving party has been identified) and signalling to the send/receive manager 46 to make a send request to the connectivity manager 21 of the CSS 20. The send request identifies the intended recipient by globally-unique name, the latter being derived from the friendly name selected by user A by reference to the address book 35. Where the CB 11 is part of the receiving system, the connection manager 45 does not trigger action by send/receive manager 46,—instead the send/receive manager is only brought into action when a data transfer request is received by the data transfer protocol layer 47 and the latter passes the job number received in that request to the send/receive manager 46. In this case, the manager 46 proceeds to verify that the data transfer request is expected by means of a verify transaction exchanged with the connectivity manager 21.

Following the send/verify phase 93, data transfer takes place in accordance with the data transfer protocol 47 (phase 94). When data transfer is complete, the data transfer protocol layer informs the send/receive manager 46 which effects a final metering transaction with the connectivity manager 21 (phase 95) and then terminates the current job (sets the job state to Idle). Once the send/receive manager 46 has terminated the current job it informs the connection manager 45 which thereupon closes the connection with the CSS 20 (phase 96) and the PPP session with its local NAP.

Connectivity Manager

Figure 6:
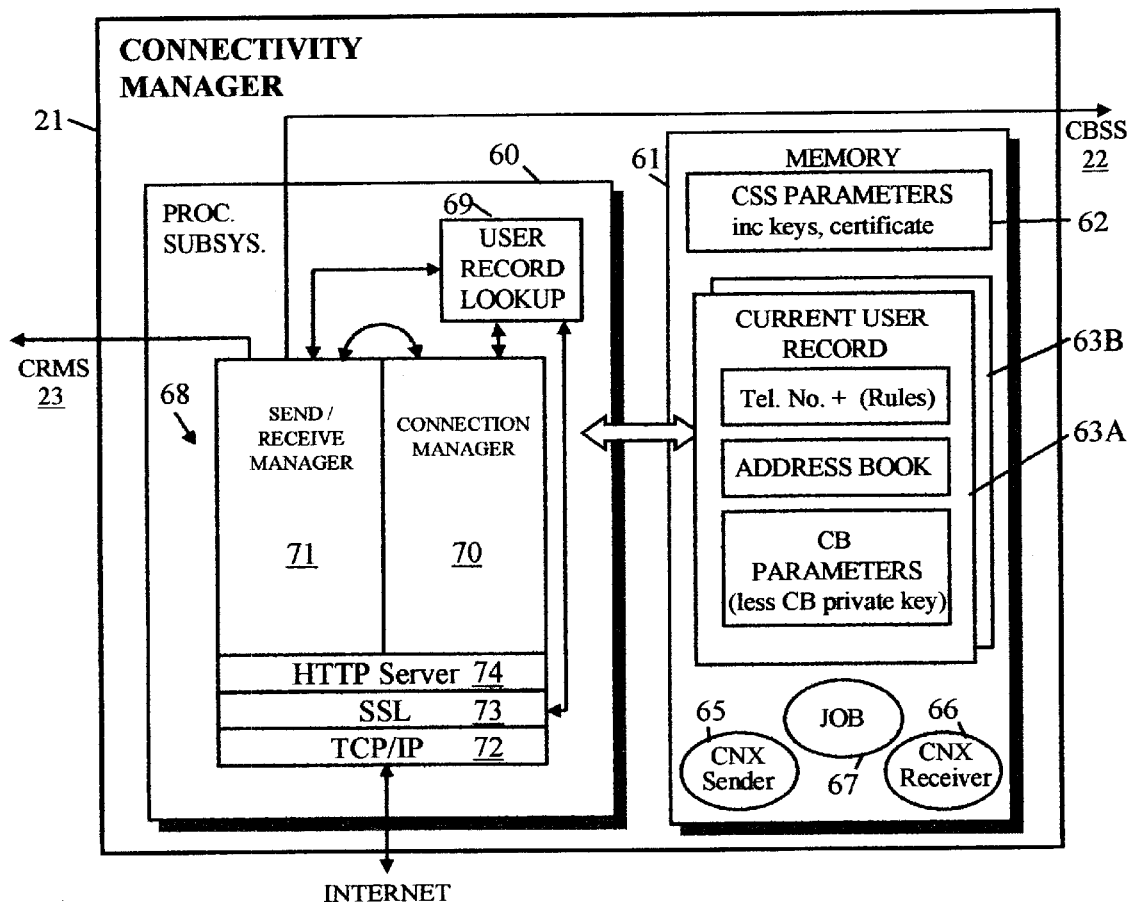
FIG. 6 is a functional block diagram of a connectivity manager provided in the communications service system of FIG. 1.

FIG. 6 is a diagram illustrating the main elements of the connectivity manager 21 of CSS 20. The connectivity manager 21 is a processor based system with internet connectivity and comprises a processor subsystem 60 and a memory 61. Memory 61 holds CSS parameters 62, subscriber records 63, and service-instance parameters 65–67 specific to each current service instance (in the present case, each inter-end-system communication linkup currently being managed).

The CSS parameters 62 include encryption data for establishing secure SSL based communications with subscriber end systems, this data being typically the private and public keys of the CSS 20, and a certificate linking the public key of the CSS to its identity.

The memory 61 preferably holds the subscriber records 63 of all subscribers in an in-memory database. However, if there are too many records to conveniently hold in memory 61, then the records held can be limited to those of subscribers currently active in communicating over the internet; in this case, records are transferred to the memory 61 from the database 24 when needed. The records concerned are not the full subscriber records including billing data but the minimal records needed to effect connectivity. In particular, each record 63 includes:

the telephone number of the subscriber and any rules limiting who is to be allowed to transfer data to the subscriber and the times of day when data transfers can be made;

the address book of the subscriber, this address book corresponding to the one held in the subscriber's CB 11;

the CB parameters of the subscriber's CB 11 (other than the private key of the latter, unless the CSS 20 is serving as the root certificate authority).

The service-instance parameters held in memory for each end-system to end-system linkup being managed by the connectivity manager, comprise details ("CNX sender") 65 of the connection with the sender system including its state, details ("CNX receiver") 66 of the connection with the receiver system including its state, and job details 67 including job number, job status, and related metering data. The details 65–67 of each linkup service instance are associated with the relevant subscriber records 63 and may be stored as temporary elements of those records or in data objects created and destroyed as needed by the connectivity manager 21.

The processor subsystem 60 provides, under program control, specific functionality represented in FIG. 6 by:

a protocol stack 68 for controlling communication setup between end systems and monitoring the related data-transfer job, each protocol layer of the stack implementing the message formats and behaviours defined by the corresponding protocol specification (the behaviours being generally defined in terms of state machines); and subscriber record lookup 69 for accessing subscriber records 63 of current interest.

The protocol stack 68 comprises two application-level protocol layers 70, 71 running on top of basic communication protocol layers. These basic communication protocol layers comprise a TCP/IP layer 72 for providing reliable transport and network services, an SSL layer 73 for secure communication with the CSS 20, and an HTTP Server layer 74 for carrying application layer transactions messages in HTTP messages. It will be appreciated that lower layers (not illustrated) exist below the TCP/IP layer to provide connectivity to the internet.

The two application-level protocol layers are a connection manager protocol layer 70 (connection manager 70), and a send/receive manager protocol layer 71 (send/receive manager 71). The connection manager 70 and send/receive manager 71 effect secure transactions with the corresponding protocol layers 45 and 46 respectively of the CBs 11 using HTTP messages to carry the transaction messages.

Figure 7:
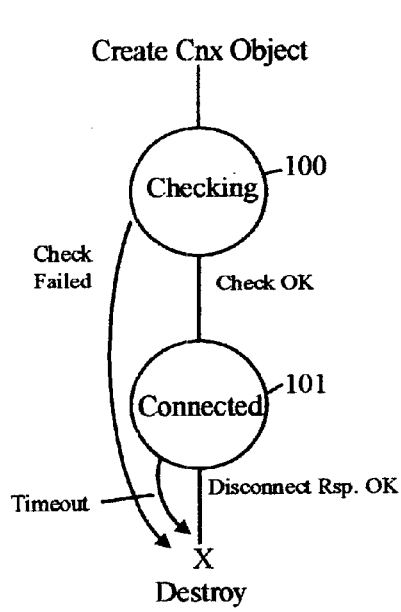
FIG. 7 is a state transition diagram illustrating the behaviour of a connection manager of the FIG. 6 connectivity manager.

The connection manager 70 manages, at the CSS, the setting up and termination of a connection between the connectivity manager 21 and a CB. As already mentioned, the main transactions of the connection manager protocol are CONNECT and DISCONNECT. FIG. 7 depicts the operation of the connection manager 70 in terms of the state of the connection between connectivity manager 21 and end-system CB, this state being held in a connection data object 65 created by the connection manager 70 upon receiving a new CONNECT Request. The initial state of the connection is Checking (state 100), this state being maintained whilst the connection manager 70 uses the lookup functionality 69 to look for the relevant end-system subscriber record 63A and determine whether the connection should be confirmed (in particular whether the end system concerned belongs to a current valid subscriber). If this check proves positive, a corresponding CONNECT response is returned to the end-system CB and the connection state is changed to Connected (state 101); however, if the check produces an unfavorable finding, a fail indication is returned to the end-system CB and the connection object destroyed. For successful connections, the state Connected is maintained until either a DISCONNECT Request is received from the relevant end system prompting the return of a positive DISCONNECT Response, or a timeout expires; in both cases exit from the Connect state is followed by destruction of the connection object concerned.

Figure 8:
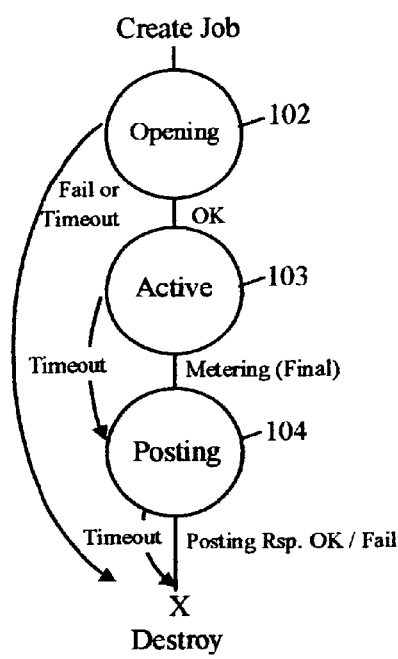
FIG. 8 is a state transition diagram illustrating the behaviour of a send/receive manager of the FIG. 2 connectivity manager.

The send/receive manager 71 is responsible for the initiation of contact between end systems to be linked up, and the metering of the data transfer between these systems; as previously noted, the main transactions of the protocol 46 are SEND (used with the sending end system), VERIFY (used with the receiving end system) and METERING. The send/receive manager 71 communicates with lookup functionality 69 to access user records, with callback signalling server 22 to initiate a wakeup call, and with the customer record management system 23 to download job and metering information following job completion. FIG. 8 depicts the operation of the send/receive manager 71 in terms of the state of a current job as held in a corresponding job data object 67 created by the send/receive manager 71 upon receiving a new SEND Request. The job data object also includes an indication of the sender A and intended receiving party B. The initial state of the job is Opening (state 102), this state being maintained whilst the send/receive manager 71 uses the lookup functionality 69 to look for the details of the intended receiving end-system subscriber B in the subscriber records and determine whether the job should proceed (in particular whether the end system concerned belongs to a current valid subscriber and the rules associated with that subscriber permit the proposed data transfer). If this check fails, a negative SEND Response is returned to the end system concerned and the job data object destroyed. However, if the check gives a positive result, the send/receive manager 71 asks the call-back signalling server 22 to make a wakeup call to the intended receiving end system at the telephone number held for the subscriber concerned in the subscriber record 63B. If the intended receiving system B successfully receives and recognises the wakeup call and successfully connects through to the connectivity manager 21, and if the connection manager 70 confirms the CONNECT Request sent by the receiving system B, then the send/receive manager 71 will in due course receive an indication from the connection manager 71 that a particular user B has connected to the connectivity manager 21. The send/receive manager 71 now tries to associate, through the globally-unique name of the receiving subscriber B, the newly connected user with the current jobs that are in their Opening state. Assuming a match is found, the send/receive manager 71 finally sends a positive SEND Response back to the sender end system A and transits the job to an Active state 103. The job stays in its Active state during data transfer between the end systems A and B, and the send/receive manager 71 handles any VERIFY and intermediate METERING transactions received from the related end systems A, B without changing the state of the job. When data transfer is complete, the end systems A, B both send METERING with final metering data causing the state of the job to be changed to Posting (state 104). The send/receive manager then transfers the job details (including the received metering data that has, for example, been temporarily held in the job data object) to the CRMS 23 for processing and storing in database 24. After effecting this transfer, the send/receive manager destroys the job data object.

It will be appreciated that the connectivity manager 21 is capable of managing multiple end system linkups concurrently.

Figure 9:
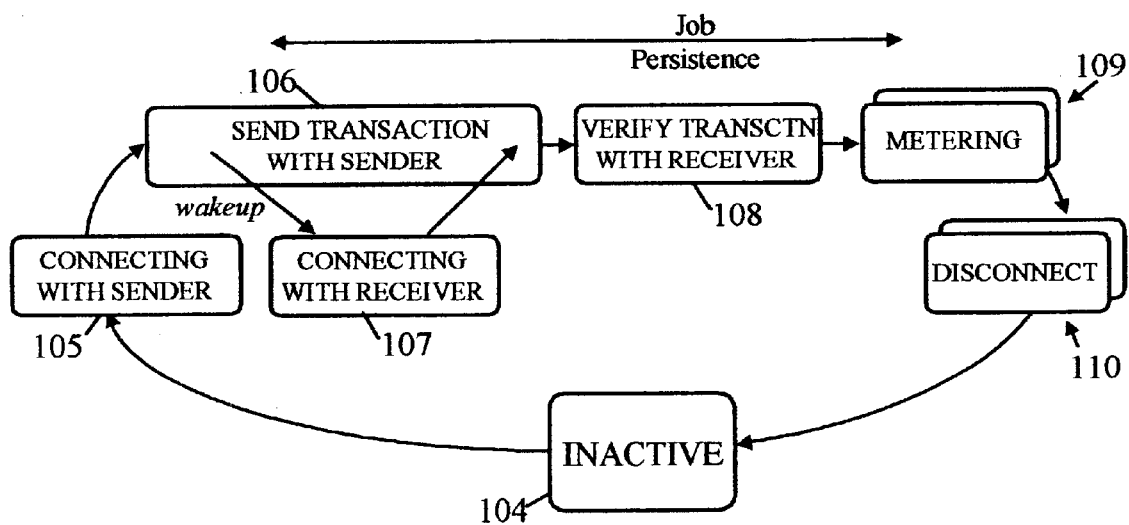
FIG. 9 is a diagram of the main operational phases of the FIG. 6 connectivity manager.

Having described individually the main elements of the connectivity manager 21, the operating phases of the connectivity manager 21 as a whole will now be described with reference to FIG. 9 in respect of a successful end-system linkup and subsequent data transfer between the systems (it should be noted that these phases are not "states" of the connectivity manager 21 as such). Starting from an inactive condition 104 (in respect of the linkup to be requested and made), the connectivity manager 21 is first contacted by the sender system and connection manager 70 confirms the setting up of a connection with the sender ("Connecting With Sender" phase 105). In due course, the sender system indicates (in a Send message) that it wishes to effect a data transfer to a specified receiver end system and the connectivity manager enters a linkup phase 106. In this phase, the send/receive manager 71 initiates a new job and, after using the lookup functionality 69 to examine the intended recipient's record, asks the CBSS 22 to wake up the intended recipient. The latter establishes (see 107) a connection with the connectivity manager 21 under the control of the connection manager 70. After this connection is set up the send/receive manager 71 is informed and it gives the go ahead to the sender system to start data transfer. The connectivity manager 21 now moves to the next phase 108 in which it verifies (or not, as the case may be) that an in-going data transfer to the receiving system is from the proper source. Thereafter, whilst data transfer is taking place the connectivity manger is in a metering phase 109 collecting metering data from the end systems. After the final metering message is received, the send/receive manager passes the metering data to the CRMS 23 and closes down the job; the connectivity manager 21 now moves into a disconnect phase 110 in which the connection manager 71 oversees the closing of the connections with the end system.

Overall Operation

Figure 10:
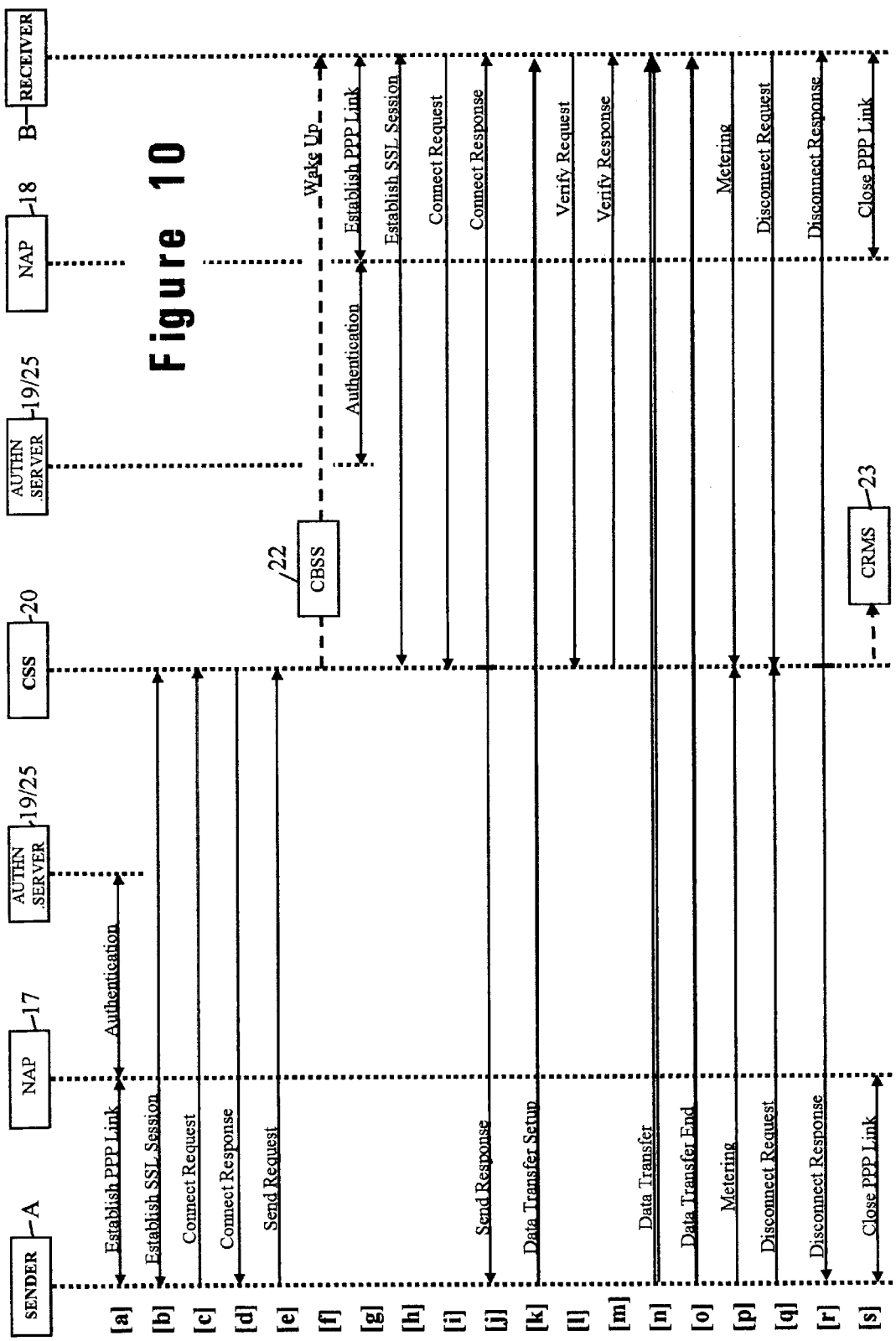
FIG. 10 is a message diagram illustrating the sequence of messages exchanged during the link-up and transfer of data between two end systems.

To conclude the description of the overall arrangement, reference is made to the message diagram of FIG. 10 that depicts the sequence of messages exchanged between components of the arrangement during the successful linkup of two end systems. This diagram shows more detail than previously given when describing the general operation of the arrangement with reference to FIG. 1; even so, not every message is shown, as will be appreciated by persons skilled in the art.

[a]—The sending end system CB 11A, in response to user A selecting a destination party and pressing the send button on the CB 11A, calls NAP 17 and establishes a PPP link, this process being effected by the PSTN and PPP layers of protocol stack 42 and involving automatic user authentication using the user name and password stored as part of the CB parameters. Preferably, this user name has a component common to all connectivity-service subscribers, this component being recognised by the NASP authentication server 19 when it receives an authentication request from the NAP 17 and resulting in server 19 passing on the authentication request to the authentication server 25 of the CSS 20.

[b]—The TCP/IP layer of stack 42 contacts the connectivity manager 21 of CSS 20 and SSL layer of stack 42 sets up (or resumes) an SSL session with the connectivity manager 21. The handshake process involved in establishing an SSL session is well understood by persons skilled in the art and will not be described herein.

[c]—Connection manager 45 sends a CONNECT Request to the connectivity manager 21 including the globally-unique name of CB 11A and the IP address assigned to it by NAP 17.

[d]—Connection manager 70 responds with a positive CONNECT Response.

[e]—Send/receive manager 46 sends a SEND Request to connectivity manager 21 including the globally-unique name of the selected receiving party.

[f]—The send/receive manager 71 of connectivity manager 21 checks that the intended recipient is OK to receive a communication and initiates the making of a wakeup call by the call-back signalling server 22 to the telephone number of the intended recipient

[g]—The CBS monitor 48 of the receiving end system CB 11B recognises the wakeup call and establishes a PPP link to its local NAP 18 by a process involving authentication in the same manner as already described for end system A (see [a]).

[h]—Receiving CB 11B sets up an SSL session with the connectivity manager 21.

[i]—Receiving CB 11B sends a CONNECT Request to connectivity manager 21 including the globally-unique name of CB 11B and the IP address assigned to it by NAP 18.

[j]—Connectivity manager 21 responds to CB 11B with a positive CONNECT Response and, at the same time, sends a positive SEND response to CB 11A including the current IP address of CB 11B.

[k]—Data transfer protocol layer 47 of CB 11A sends a data transfer setup message directly to CB 11B.

[l]—CB 11B, on receiving the setup message, sends a VERIFY Request to the connectivity manager 21 to check that the data transfer is an authorised one.

[m]—Connectivity manager 21 replies with a positive VERIFY Response.

[n]—The data transfer from end system A to end system B is carried out. Although not illustrated, intermediate metering transactions may be effected during the course of data transfer.

[o]—The data transfer layer 47 of the sending CB 11A signals to the peer layer of the receiving CB 11B when data transfer is complete.

[p]—On termination of data transfer, the send/receive managers 46 of the end-system CBs 11 effect final METER-ING transactions with connectivity manager 21.

[q]—The connection mangers 45 of the end-system CBs 11 send DISCONNECT requests to the connectivity manager 21.

[r]—The connectivity manager 21 responds with positive DISCONNECT Response messages to both CBs 11.

[s]—The CBs take down their PPP links to their respective NASPs and terminate their PSTN calls. The connectivity manager 21 posts the job details to the CRMS 23.

Call-Back Signalling

As explained above, the intended receiving end system is woken up to bring itself on-line by means of a wakeup call made to it over the PSTN 16 by the call-back signalling server 22. This wakeup call is recognised by the CBS monitor 48 in the receiving-system CB 11B without the need for the call to be answered. Since the CB 11 is intended to be connected to a telephone line 13 that may be shared with other devices (such as telephone 12 in FIG. 1), the characteristics of these other devices place constraints on how the wakeup call functionality is implemented. Thus account needs to be taken of the fact that the audible ringing of a telephone can be annoying, particularly if prolonged and particularly if it results in a user answering a call that is not a "live" one with another human. Account also needs to be taken of the fact that most answering machines will normally be set to pick up an unanswered incoming call after three or more rings (though they may also be set to pick up immediately). Accordingly, in the present embodiment, the CBS server 22 is arranged to terminate the wakeup call after no more than a limited number of ring cycles (for example, after no more than 2 ring cycles), and the CBS monitor 48 has a default behaviour by which it disregards as a wakeup call, any call that rings more than this limited number of times (it should be noted that reference to a "ring" as used herein means the ringing occurring during one ring cycle regardless of the actually ringing pattern involved.

It is possible to use the foregoing criterion for a wakeup call (referred to below as "limited ringing") as not only a necessary condition but also a sufficient one, with the receiving CB 11 being arranged to call back the CSS 20 whenever there is limited ringing. Of course, this may result in call backs being made when the incoming call is not a wakeup call (for example, because a user picks up a call after the first ring thereby resulting in the limited ringing criterion being satisfied), this is not critical as it will simply result in a connection being established to the connectivity manager 21 that in due course times out (see FIG. 3).

Nevertheless, it is preferable to refine the recognition of what constitutes a wake up call, both by further qualifying the limited ring criteria to rule out certain calls which might otherwise be falsely considered wakeup calls, and by allowing a slight relaxation of the limited ring criterion where other indicators of a wakeup call are present.

More particularly, a wakeup call can be taken as present when both the limited ringing criterion and any one of the following additional criteria are jointly met:

(a)—the limited ringing is followed immediately by call termination without pickup;

(b)—the limited ringing is terminated by call pick up (by a device connected to the same telephone line 13, typically the telephone 12) followed quickly by call termination—this criterion is based on the presumption that the call has been picked up by a user who quickly realises that the call is for the CB (for example, as a result of a message or sound signal played by the CBS server 22 whenever a wakeup call is picked up);

(c)—the limited ringing is terminated by call pick up followed by an audio signal transmitted as part of the call and recognised by CBS monitor 48 as characteristic of a wakeup call (the audio signal may be a combination or pattern of tones possibly spaced by periods of silence);

(d)—the limited ringing is terminated by call pick up followed by a sustained period of silence (possibly after an initial message/signal to indicate to the user the nature of the call)—in this case, the CB would go off-hook itself when ringing stopped and reliance is placed on the fact that the user will generally hang up quickly whilst the CBS server can be arranged to hold the call in silence for as long as deemed appropriate to give the CBS monitor an opportunity to recognise the sustained period of silence (the latter being, for example, of 10 seconds duration).

With regard to relaxation of the limited ringing criterion in the presence of other wakeup-call indicators, this involves recognising a wakeup-call indicator, present during ringing, within the number of rings set by the limited ringing criterion; such indicators include:

(e)—a caller ID corresponding to the CBS server 22, this caller ID being typically encoded in the wakeup call between the first and second ring cycles (this facility is offered by most PSTN operators as a value-added service to which a user may subscribe);

(f)—a "distinctive ring" chosen to indicate for that user that the incoming call is a wakeup call (a "distinctive ring" is a distinctive ringing pattern within each ring cycle and is another value-added service offered by many PSTN operators).

The embodiment of the CBS monitor 48 to be described below utilises the limited ring criterion as modified by each of criteria (a), (b) and (e) above for recognising a call as a wakeup call.

It may be noted that the use of caller ID or distinctive rings as wakeup-call indicators could each be treated by the CBS monitor 48 as a sufficient indicator of wakeup calls without reference to the limited ring criterion. However, since both caller ID and distinctive rings are value added services, it is preferable that neither constitute the only test permitted for a wakeup call (or are the only two tests permitted) and so the desirability for a limited-ring based test remains; as a limited ring test requires the CBS server to limit the number of rings, associating this criterion with caller-ID/distinctive-ring in the relaxed form proposed in (e) and (f) above is no disadvantage.

Each of the additional wakeup-call criteria set out in (b), (c) and (d) above for the case of call pickup, could also be treated by the CBS monitor 48 as a sufficient indicator of wakeup calls without recourse to the limited ring criterion.

The operation of the CBS server 22 and CBS monitor 48 of the present connectivity service arrangement, will now be described with reference to FIGS. 11 to 15 and, in particular, with reference to the signalling sequence diagrams of FIGS. 11 and 12 that respectively relate to normal wakeup call operation, and operation in the case where the call is picked up at the end system.

Considering first the CBS server 22, this is connected to the PSTN by an ISDN PRI connection (or other suitable connection such as BRI) so as to enable multiple wakeup calls to be handled concurrently. The CBS server 22 is for example an appropriately programmed computer (preferably in a high availability configuration) provided with a suitable ISDN interface 27 (FIG. 1) and means 28 for playing audio message over the ISDN link. The normal behaviour of the CBS server 22 is represented on the left hand side of FIG. 11 and involves:

initiating a wakeup call to the target end system B by sending a call setup message 120 over the ISDN signalling channel, this message including both the telephone number of end system B and a caller-id for the connectivity service, and upon receipt back of an indication that the call has been placed (the receipt back of an alerting message 122 which occurs subsequent to receipt of a call proceeding message 121), allowing the call to continue for a period P1 before terminating the call (by sending a release message 123 which is followed by receipt back of a release acknowledge message 124).

The duration of the period P1 (which can adjusted by the CBS server 22) is set such that the telephone 12 B at end system B will ring no more than twice and possibly less. In FIG. 11, the period P1 is shown as being timed from receipt of the alerting message 122 at the CBS server 22; however, P1 could alternatively be timed from, for example, the receipt of the call proceeding message 121 (thereby ensuring correct operation in cases where the alerting message fails to be received back at the CBS server 22).

In the event that the wakeup call is picked up at end system B before being released by the CBS server 22 (see left-hand side of FIG. 12), the server, after exchanging connect and connect acknowledge messages 130, 131 with the PSTN, uses its means 28 to play an announcement 132 informing user B that the call is a connectivity service wakeup call and that the line should be released (telephone placed back on hook) as soon as possible. Preferably, the announcement starts with a distinctive audio "mark", such as a sequence of tones, to warn the user (and potentially also the CB 11B) that the call is a wakeup call without the need for further verbal explanation (though the latter would still normally be provided). The server 22 then terminates the call (disconnect message 133 etc.), the total call time from pickup being limited, for example, to less than 10 seconds.

The CBS server 22 can be provided with software for analysing audio signals received following pickup of a wakeup call, in order to differentiate between playback of an answering machine message and a real user answering. Where pickup by an answering machine is detected, it is not necessary for the CBS server 22 to play a message and it can terminate the call straight away. Of course, for variants of the present embodiment discussed above where the CBS monitor 48 expects to receive a characteristic audio signal in the event of wakeup-call pickup, it would still be necessary to play that signal even if pickup was detected as being by an answering machine. Similarly, for variants relying on the presence of a period of silence to indicate a wakeup call, this period of silence would still need to be included by the CBS server 22 before terminating a call.

Figure 13:
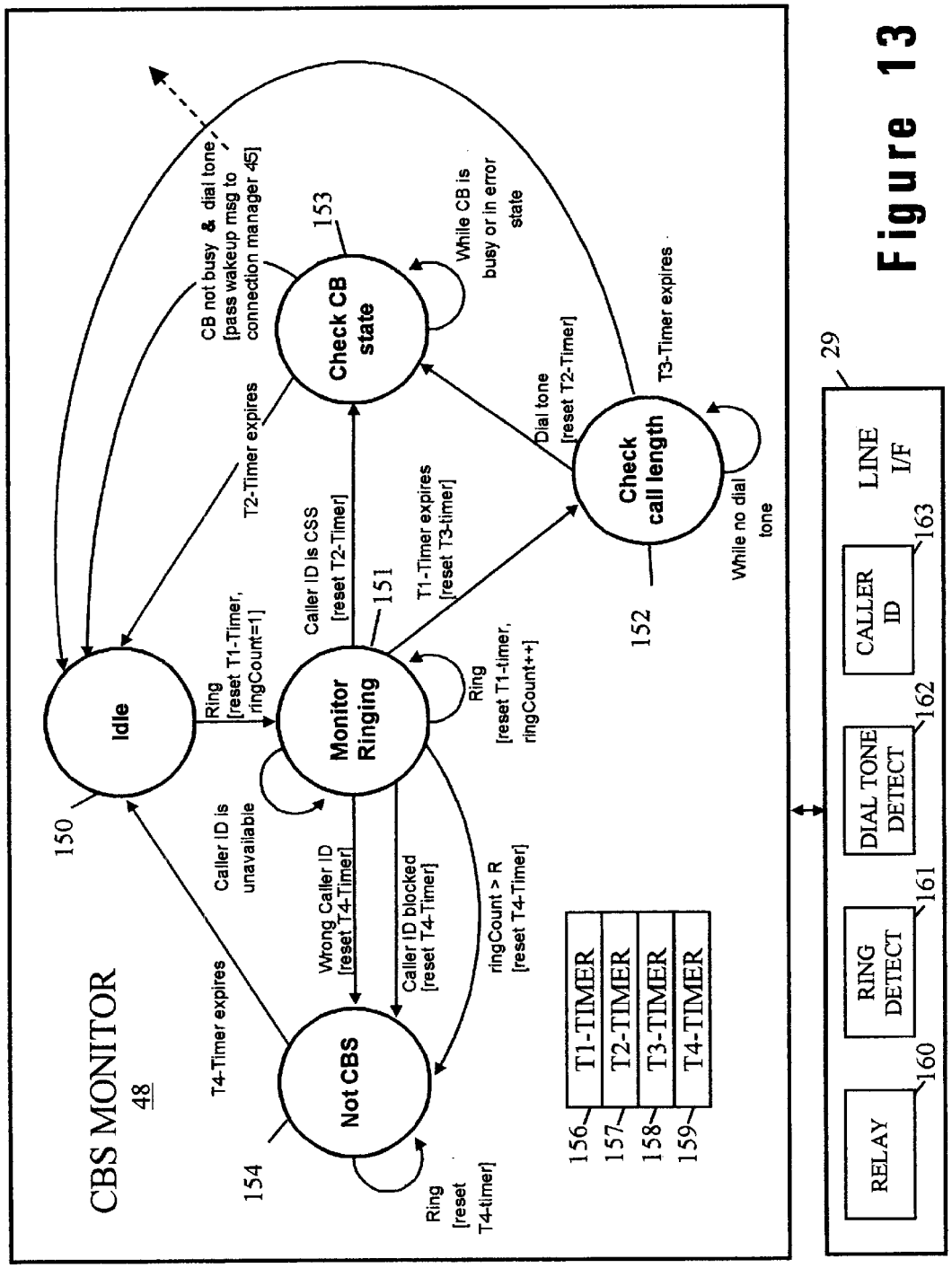
FIG. 13 is a depiction of a call-back signalling monitor of the FIG. 2 connectivity box with the behaviour of the monitor being represented by a state transition diagram.

With regard to the CBS monitor 48, as already described, this is implemented as part of the program-controlled processor system of the CB 11 with inputs being fed to the monitor from the modem 30 and more particularly, from the line interface circuitry 29 (FIG. 2) of the latter rather than the mod/demod part of the modem. As depicted in FIG. 13, the line interface circuitry 29 includes an on-hook/off-hook relay 160, ring detect circuitry 161, and dial-tone detect circuitry 162. For reasons to be explained below, the monitor 48, as well as receiving input from the ring detect and dial-tone detect circuitry 161, 162, is also arranged to effect control of the on-hook/off-hook relay 160 (control of the latter also being possible, of course, through the PSTN layer 50). The CBS monitor 48 (FIG. 13) provides the behaviour represented by the state machine shown within the boundary of the monitor in FIG. 13. This state machine has five states, namely an Idle state 150, a Monitor Ringing state 151, a Check Call Length state 152, a Check CB state 153, and a Not CBS state 154. The CBS monitor includes four timers 156–159 (named T1-Timer, T2-Timer, T3-Timer and T4-Timer) for timing respective timeout periods T1–T4 associated with operation in accordance with the FIG. 13 state machine. The significance of these timeout periods, and suitable values for each, are given below:

T1—7 sec. This is a period slightly greater than the main ring cycle time (for North America, the main (class 1) ring cycle time is 6 seconds). Used in Monitor Ringing state 151.

T2—60 sec. Time window within which CB is expected to call back the CSS 20 after receiving a wakeup call.

T3—10 sec. Maximum answered call length (with limited ring criteria met) to be understood as a wakeup call.

T4—7 sec. Same as T1. Used in Not CBS state 154.

A parameter R is also shown in FIG. 13, this being the maximum number of ring cycles (completed or in progress) permitted for a wakeup call—in the present example, R=2. The number of ring cycles (including a current cycle) for a current call is tracked by the variable "ringCount".

Figure 14:
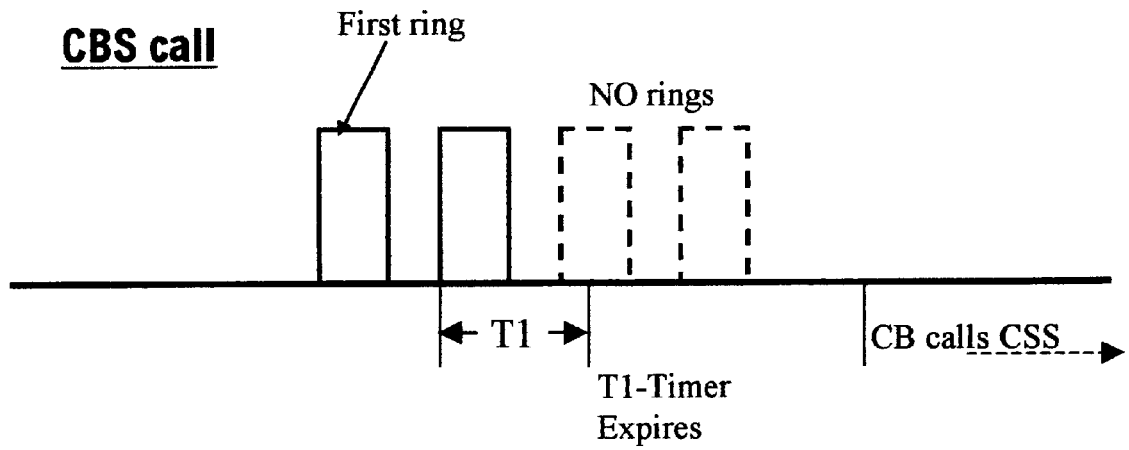
FIG. 14 is a diagram illustrating the telephone ringing occurring in the case depicted by FIG. 11.

Operation of the CBS monitor 48 will now be described for the case where a wakeup call not employing CallerID, is detected on the basis of a limited ring and supplemental criterion (a) (that is, immediate line availability), this case being illustrated in FIGS. 11 and 14 and being in accordance with FIG. 13 state machine. The monitor starts in its idle state 150, listening to the line 13 (this latter is assumed to be in its on-hook state—that is, no connected devices are active). When a wakeup call is received, a ringing signal 125 appears on the line and this is detected by the ring detect circuitry 161 of line interface 29 which indicates as much to the monitor 48. The monitor 48 immediately transits to its Monitor Ringing state 151, resets the T1-Timer 156 and sets the variable "ringcount" to a count value of "1" (such actions are indicated in square brackets in FIG. 13). The T1-Timer starts counting down an initial period of duration T1 but before the timer expires a new ringing cycle starts, causing the T1-Timer to be reset; this happens for each new ringing cycle. A new ringing cycle is judged to have started at the beginning of each repeat of the ringing pattern. The monitor counts the ring cycles, incrementing the value of "ring-Count" at the same time as resetting T1-Timer 156. As this is a CBS call, ringing stops after no more two ring cycles— for convenience, it is assumed that a second ring cycle has started before ringing terminates so that R=2. Monitor 48 remains in its Monitor Ringing state 151 until the T1-Timer times out at a time interval T1 after the last ring-cycle start (this time-out situation is depicted in FIG. 14). As noted above, T1 is longer than the ringing cycle period and so if the T1-Timer has not been reset, it is appropriate to assume that ringing has stopped. These conditions of R=2 and ringing stopped correspond to the limited-ringing criterion for a wakeup call having been met, and monitor 48 now transits to its Check Call Length state 152 with the T3-Timer 158 being reset to start timing a period T3.

Whilst in its Check Call Length state 152, the monitor 48 checks for the supplemental conditions (a) and (b) noted above that are used to qualify whether a call with limited ringing is a wakeup call (condition (a) being call termination without pickup and condition (b) being call pickup followed by rapid termination). Monitor 48 effects this check by regularly (for example, every 1 to 5 seconds, starting immediately state 152 is entered) activating the on-hook/off-hook relay 160 of the line interface circuitry 29 to cause the CB to go off-hook for a short period (for example, 1 second), and then during this CB off-hook period checking for the presence of a dial tone (as indicated by the dial-tone detection circuitry 162 of the line interface 29). If a dial tone is present and T3-Timer has not expired, the call giving rise to the limited ring condition, will have satisfied one or other of the supplemental conditions (a) and (b) and is therefore taken to be a wakeup call; this results in the monitor 48 transiting to its Check CB state 153 with the T2-Timer being reset. In the current example where the wakeup call has been terminated without pickup (supplemental condition (a)), the dial tone is detected at the first attempt so that the monitor will transit from state 152 to state 153 almost immediately.

In its Check CB state 153 the monitor 48 checks that the CB is ready to make an outward call (that is, it is not busy with some other task or in an error condition); provided the CB becomes available within period T2, the monitor 48 will pass a wakeup message to the connection manager 45 to initiate connection to CSS 20, and return to its idle state 150; connection manager 45 then causes the CB to go off-hook and call NAP 18 (arrow 127 in FIG. 11) and connection setup proceeds as previously described. If, however, the T2-Timer times out before the CB is available, monitor 48 simply returns to its idle state 150.

Figure 15:
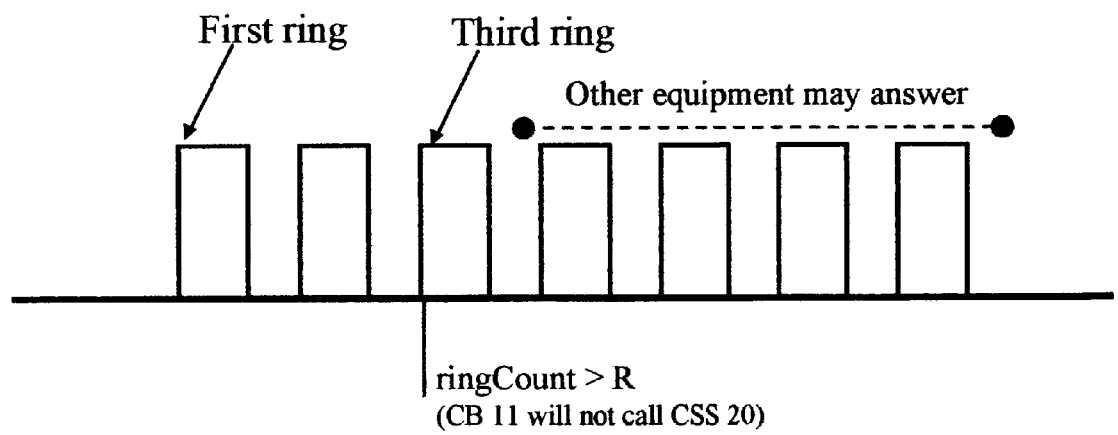
FIG. 15 is a diagram illustrating the telephone ringing occurring in the case of a normal call.

If, in fact, the call had not been a wakeup call but a normal call that rings for more than two ring cycles, then with the monitor 48 in its Monitor Ringing state 151, the start of the third ring cycle will set R=3. This determines that the call (which does not include CallerID) is not a wakeup call (as depicted in FIG. 15) with the result that the monitor 48 transits from its state 151 to its Not CBS state 154. In state 154, the monitor waits out the current ringing by resetting the T4-Timer at the start of each new ring; if the T4-Timer times out then this indicates ringing has stopped (T4 being greater than the ring cycle period) and the monitor returns to its idle state.

Figure 11:
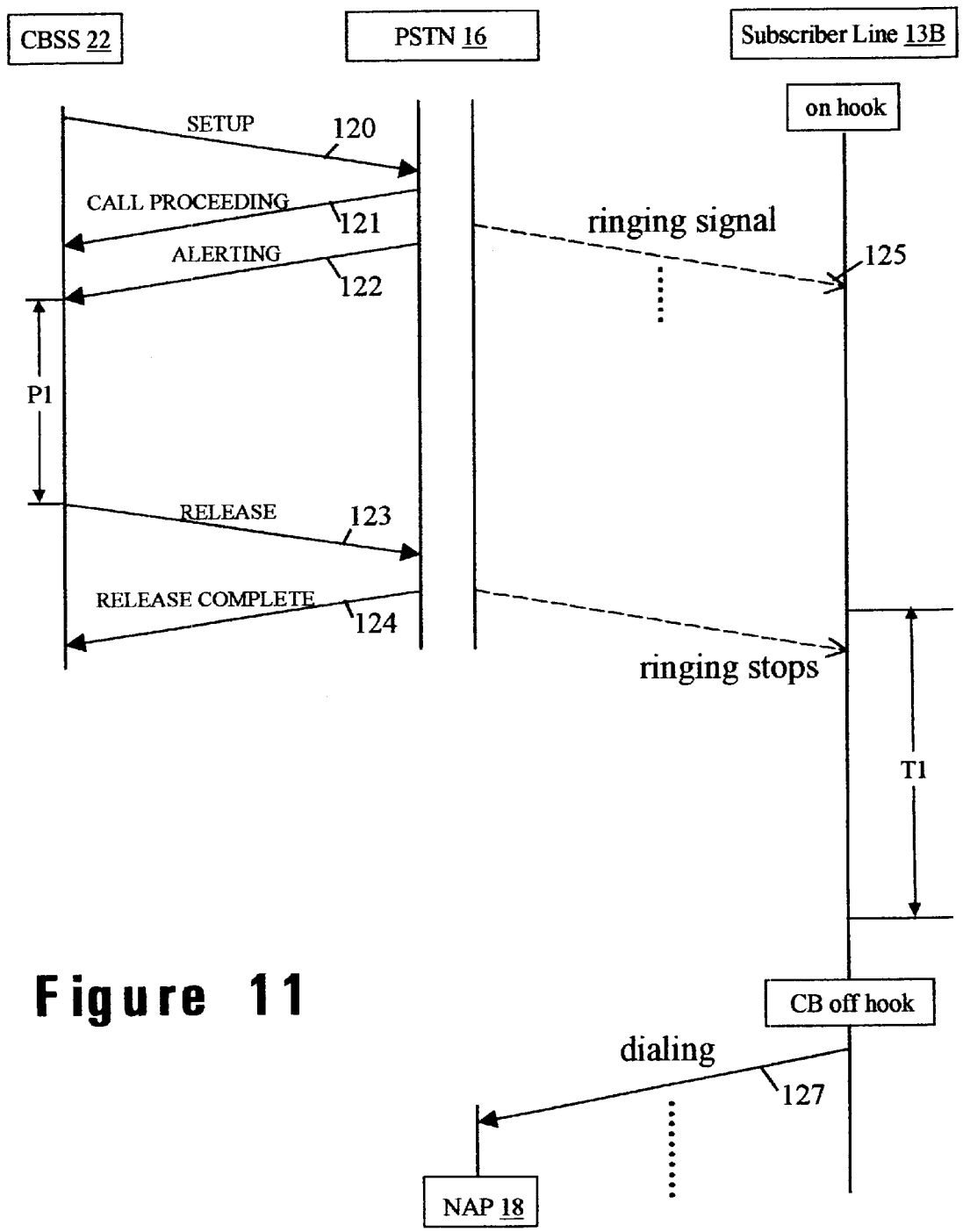
FIG. 11 is a signalling sequence diagram showing a successful, unanswered, wakeup call placed by the communications service system of FIG. 1 to the FIG. 2 connectivity box.
Figure 12:
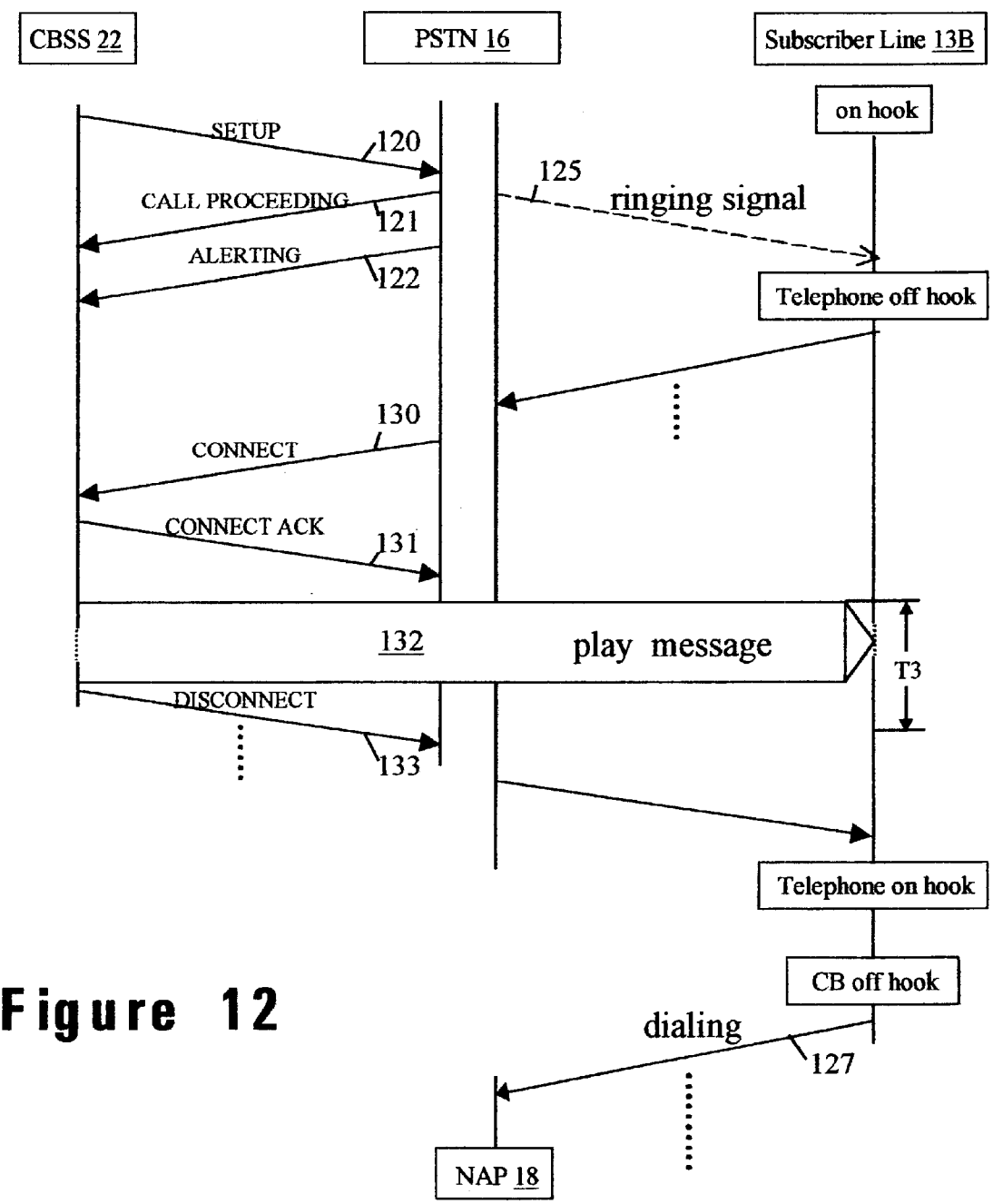
FIG. 12 is a signalling sequence diagram similar to FIG. 2 but showing the case where the wakeup call is picked up at the receiving end system.

FIG. 12 represents a situation similar to that of FIG. 11 where a wakeup call, without Caller ID, is made to end system B; however, in the FIG. 12 example the call is picked up before termination (for example, user B answers the telephone notwithstanding that it has rung less than two full ring cycles). Since ringing has been stopped with R<3, the monitor which was in its Monitor Ringing state 151 during the initial ringing, transits to its Check Call Length state 152 upon timeout of the T1-Timer 156. Unlike the FIG. 11 situation, when the monitor first checks for a dial tone (which it does in the manner already described when in the state 152), it finds no dial tone present and therefore continues to reside in state 152. If the line 13 is freed up (generally by the user B replacing the telephone) and a dial tone detected before expiry of the T3-Timer, a wakeup is assumed to have been made and the monitor transits to state 153 and proceeds as already described for the FIG. 11 case. User B is encouraged to rapidly replace the telephone b, the message 132 played to the user by the CBS server 22 in the case of wakeup call pick up. In the event that the user does not replace the telephone immediately or the line is not freed for whatever reason within the timeout period T3, then the call is assumed not to be a wakeup call and expiry of the T3-Timer therefore results in the monitor 48 returning to its idle state without messaging the connection manager 45.

If an audio signal characteristic of a wakeup call is included in the message played by the server 22, then CB can be arranged to listen for this signal when in state 152 and if this signal is detected, transition to state 153 with the T2-Timer being reset.

Turning now to situations where user B has a CallerID service, as is well understood, for analogue telephone lines the CallerID information is generally inserted between the rings of the first and second ring cycles of a call. This, of course, means that a wakeup call can still be restricted to two ring cycles whilst permitting the transfer of CallerID information identifying the call as coming from the CBS server 22. To enable the monitor 48 to take advantage of CallerID information, the monitor is arranged to read the CallerID by means of functionality well known to persons skilled in the art; for clarity such functionality is here represented by a Caller ID block 163 provided in the line interface 29 (though in practice it would normally be on the same chip as the main modem circuitry). Now, whenever a call is received that includes CallerID information, the monitor can immediately vet the call and determine if it is a wakeup call; the monitor does this whilst in its Monitor Ringing state 151. If the detected CallerID corresponds to that of CBS server 22 then the monitor (if still in state 151) will recognise the call as a wakeup call and transit to the Check CB state, resetting the T2-Timer as it does so; the monitor then proceeds as described above for the FIG. 11 case. If, however, the monitor 48 reads a different CallerID or the CallerID has been set to be blocked by the caller (itself proof that the call is not a wakeup call), then the monitor exits state 151 to its Not CBS state 154 and waits out the ringing as already described. If CallerID is simply not available, the monitor remains in state 151 until another exit condition is met.

The use of "distinctive ring" to identify a wakeup call to the CB can be implemented for the FIG. 13 monitor 48 substantially in the same manner as for CallerID (with, of course, the provision of suitable circuitry for detecting the particular distinctive ring designated for the wakeup call).

Variants

Many variants are possible to the above-described embodiment of the invention, some of which are noted below.

Thus, whilst it is envisaged that the sending and receiving end systems will generally both have internet access through dial-up connections, the sending system could have more direct access (for example, it could be connected to a enterprise LAN that connects to the internet through a firewall); in this case, the basic operation of the communications service system and of the receiving end system are substantially the same as already described.

Furthermore, it is possible for the sending system to send to a selected distribution list (that is, to multiple receiving systems rather than just one); to accommodate this, the address books in both the CB and CSS would need to hold such lists in a manner enabling their individual identification so that the CB can tell the connectivity manager the list to be sent to, the connectivity manager thereafter controlling connection set up accordingly. This assumes that it is the connectivity manager that is responsible for processing the distribution list—it is alternatively possible for the CB to be solely responsible for the list, asking the connectivity manager to wake up each intended recipient. The actual transmission to multiple destinations can be effected using a multicasting technique.

With regard to how the current IP address of one end system is passed to the other, in the described embodiment the connectivity manager passes the receiving end system IP address to the sending end system in the SEND response message. However, it would be possible to operate otherwise; for example, the receiving end system could be told the IP address of the sending system by the connectivity manager and it then becomes the responsibility of the receiving end system to contact the sending system Whilst authentication of subscribers on connection to their local NAP is highly desirable, it is not, of course, essential. The same is true of the security surrounding the connections established between the end systems and the CSS 20.

The setting up of an SSL session between a CB 11 and the connectivity manager 21 involves a substantial processing and handshake messaging overhead if done ab initio with the creation and sharing of a master secret. Accordingly, rather than repeating this process for each connection established between a CB 11 and manager 21, the same master secret can be re-used repeatedly, the SSL session being resumed, with a much shorter handshake, at each connection rather than started anew.

Furthermore, since the process of establishing an SSL session (whether a new one or a resumed one) involves a CB 11 establishing its identity, in the form of its user's globally-unique name, with the connectivity manager 21, this name need not be included in the CONNECT Request message.

With regard to configuration of a CB 11 with values for its CB parameters 36, this could be at the time of product purchase/subscription to the connectivity service, by service personnel (for example by inserting a programmable memory device programmed with the parameter values). However, it is preferable that provision is made for remote configuration of the CB and it is for this reason that the CB parameters include the unique serial number of each CB and the associated certificate linking that serial number to the public key of the CB. This remote configuration process does not itself form part of the present invention and is therefore not described herein.

The CB 11 is shown as connected off the subscriber line 13 in the conventional way of adding equipment to the line. However, there are some advantages to be gained in interposing the CB between the line entry to the receiving end system and the other equipment connected to the line. In this case, the CBS monitor would only pass on ringing after the first two (more generally R) rings—that is, only if it determines that the incoming call is not a wakeup call. With such an arrangement, the first two rings are not heard by the user who is therefore not disturbed at all by the wakeup calls sent to the CB.

It will be appreciated that although the CBS monitor 48 has been described as implemented by program(s) executed by the processor subsystem 33 of the CB 11, it would also be possible to implement the monitor by dedicated circuitry (though generally with provision for setting and adjusting certain parameters (such as T1–T4 and R). Furthermore, the use of the call-back signalling elements (server 22 and monitor 48 with its associated circuitry 160–163) can be used in applications other than that described (the waking up of CB 11).

Whilst in the described embodiment the wakeup call is injected directly from the CBS server 22 into the PSTN, it will be appreciated that the call could be sent out over the internet 15 as a VoIP call towards the PSTN number of user B, the call being transformed into a normal PSTN call at an appropriate gateway as is well understood by persons skilled in the art.

Figure 16:
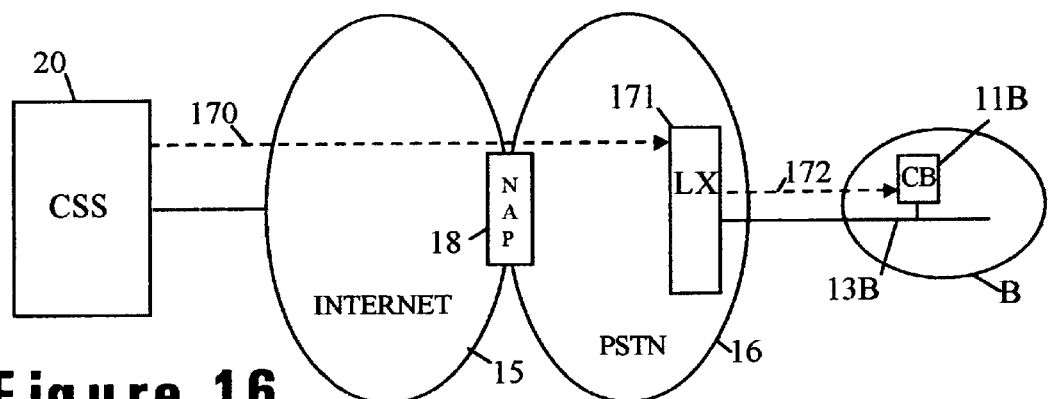
FIG. 16 is a diagram illustrating wake-up of the receiving connectivity box by signalling on the telephone line independent of a normal call.

Wakeup of CB 11 could be effected by means other than a wakeup call causing ringing over the telephone line 13. For example, non-ringing signalling could be used over the phone line such as is employed for the known Voice Message Waiting Indicator (VMWI) service by some PSTN operators—indeed, the VMWI service could be adapted to provide a wakeup indicator for recognition by the CBS monitor. FIG. 16 illustrates such an arrangement in which CSS 20 sends a message 170 to the local exchange 171 of the receiving system B to prompt the latter to transmit a VMWI-based signal on line 13B, the receiving connectivity box 11B being operative to detect signal 172 and initiate a call to NAP 18. The message 170 can be sent over the Internet or other wide area network directly to a suitable interface of the local exchange, or the message 170 can take the form of a suitably adapted SS7 signalling message sent over the signalling system of the PSTN.

Figure 17:
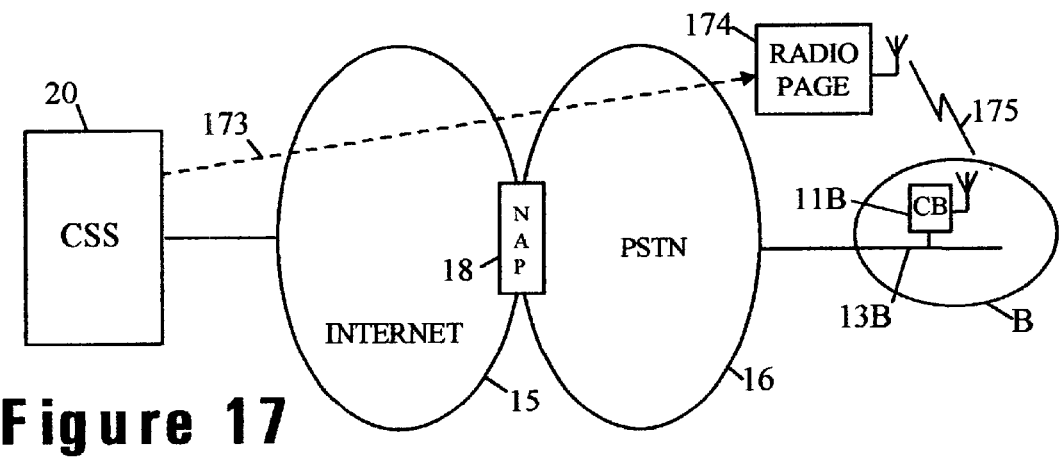
FIG. 17 is a diagram illustrating wake-up of the receiving connectivity box by radio paging.

Another possibility is for a wakeup indicator to be transmitted over a channel independent of the telephone line; for example a radio pager could be associated with the receiving CB and used for receiving wakeup calls. This arrangement is illustrated in FIG. 17 where the CSS 20 is illustrated as sending a message 173 to a radio paging system 174 to cause the latter to automatic transmit a wakeup signal 175 to the receiving connectivity box 11B. The message 173 can be sent to the radio paging system by any suitable means such as directly through the internet or through the PSTN.

Figure 18:
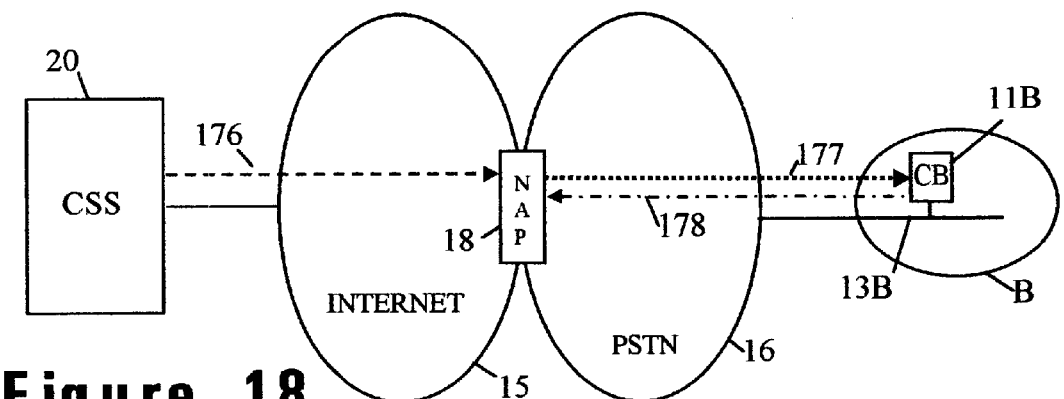
FIG. 18 is a diagram illustrating the placing of a wakeup call through a network access point and the use of the circuit so established to provide network access for the receiving connectivity box.

Furthermore, whilst all the wakeup call mechanisms referred to above are intended to prompt the CB to call back the CSS 20 by dialling its local NAP 18, it is possible to arrange for the NAP 18 to initiate the wakeup call passing through the local telephone network to CB 11 so that pickup of the wakeup call by CB 11 would directly provide a PSTN connection to the NAP 18. The CB could then use this telephone connection to establish a PPP session and connect through to CSS 20 without the need to make a new call. To achieve this, the NAP 18 is provided with means operative to recognise a wakeup call request 176 (FIG. 18) from the CSS 20, to place a call 177 to user B at the telephone number specified in the request, and to expect back signalling 178 for establishing a PPP (or similar) session; the NAP 18 should also be capable of playing a message/audio signal to user B if the wakeup call is picked up but the expected PPP setup signalling is not received, thereby indicating that the call was picked up by something other than the CB. It will be appreciated that the NAP 18 is thus providing much of the functionality previously included in CBS server 22. This arrangement requires the CB to pickup the wakeup call before other equipment connected to line 13 and the use of either CallerID or "distinctive ring" is the preferred way of indicating to the CB that the call is a wakeup call (clearly the limited ring criterion for recognising a wakeup call is no longer appropriate). Additionally or alternatively, the CB could listen to the beginning of any call that is picked up by other equipment (or, indeed, by itself if no other device picks up after a set number of rings), the NAP 18 being arranged to send a characteristic audio signal at the start of any picked-up wakeup call; in this way, the CB can recognise a wakeup call, go off-hook itself and attempt to take over the call (possible if the other equipment is put back on hook which can be assumed if no audio signal is heard for a set period, for example, three seconds—if this does not happen within a predetermined time, for example 30 seconds, the CB gives up and goes back on hook). The NAP 18 thus preferably responds to wakeup-call pickup by playing the aforesaid distinctive signal, waiting for a distinctive reply back from the CB for a short period, arid if this reply is not received, then playing an audio message to warn the user that this is a wakeup call; if the user has picked up the telephone, this should be replaced within the period for which the CB is off hook and waiting to take over the call. In fact, it is not essential to rely on an audio signal to identify the call as a wakeup call to the CBS monitor, it being possible simply to depend on a set period of silence in a picked-up call to indicate to the CBS monitor that a wakeup call is present (if the user has picked up the call, the user will generally hang up quickly if an initial wakeup call message/signal is played—or, indeed, absent the receipt of any meaningful communication).

All of the above-described techniques for waking up customer-premises equipment are capable of use in contexts additional to that described (establishing communication with a network based service system) and may be used individually or in combination.

What is claimed is:

1. A method of initiating communication between a service system connected to an IP network at a known address, and customer-premises equipment connected to a telephone line to which other customer-premises apparatus may also be connected, the telephone line being part of a telephone system through which said equipment can connect to a network access point to access said IP network with an address that is assigned each time connection to the network is established, said method comprising:

initiating, from the service system, the placing of a wakeup call to said telephone line, the wakeup call being a ringing telephone call with particular characteristics;

monitoring said telephone line at the customer-premises equipment and upon detecting said wakeup call by its particular characteristics, accessing said IP network from the equipment by placing a telephone call through telephone system to the network access point and establishing an IP link between the equipment and said network access point;

establishing contact from the customer premises equipment over the IP network with the service system at said known address; and passing from the customer-premises equipment to the service system, the current network address of said equipment, wherein the equipment and service system, knowing each others network addresses, can intercommunicate.

2. A method according to claim 1, wherein initiating the placing of a wakeup call involves associating a characteristic caller ID with the wakeup call, and monitoring said telephone line at the customer-premises equipment involves determining, for each incoming telephone call on said telephone line, whether the call is a wakeup call on the basis of the presence or absence on said line of said characteristic caller ID.

3. A method according to claim 1, wherein initiating the placing of a wakeup call involves associating with said wakeup call a distinctive ring characteristic of wakeup calls at least for said telephone line, and monitoring said telephone line at the customer-premises equipment involves determining, for each incoming call on said telephone line, whether the call is a wakeup call on the basis of whether or not the call has a ring pattern corresponding to said distinctive ring that is characteristic, at least for that line, of wakeup calls.

4. A method according to claim 1, wherein initiating the placing of a wakeup call involves transmitting as part of said wakeup call upon pickup of the latter, an in-band signal characteristic of wakeup calls, and monitoring said telephone line at the customer-premises equipment involves determining, for each incoming call on said telephone line, whether the call is a wakeup call on the basis of the presence or absence on said line of said in-band signal characteristic of wakeup calls following pickup of the call.

5. A method according to claim 1, wherein initiating the placing of a wakeup call involves terminating said wakeup call upon pickup of the latter, within a predetermined short period characteristic of wakeup calls, and monitoring said telephone line at the customer-premises equipment involves determining, for each incoming call on said telephone line, whether the call is a wakeup call on the basis of the call being terminated within said short period characteristic of wakeup calls following pickup of the call.

6. A method according to claim 1, wherein initiating the placing of a wakeup call involves including in said wakeup call within an initial period following call pickup, a period of silence characteristic of wakeup calls, and monitoring said telephone line at the customer-premises equipment involves determining, for each incoming call on said telephone line, whether the call is a wakeup call on the basis of the occurrence, within an initial interval following call pickup, of said period of silence characteristic of wakeup calls.

7. A method according to claim 1, wherein said wakeup call is initiated as a Voice over IP call to a gateway providing access to said telephone system.

8. A method according to claim 1, wherein in the event of wakeup call pickup, a message is played over the line indicating that the call is a wakeup call.

9. A method of initiating communication over an IP network between a first end system and a second end system using the services of an intermediary service system connected to the network at a known address, at least the second of said end systems being connected to a telephone line that is part of a telephone system through which the second end system can connect to a network access point to access said network with an address that is assigned each time connection to the network is established, said method comprising:

passing from the first end system, over the network, to said intermediary system, a network address through which the first end system can be contacted, establishing contact between the intermediary system and the second end system over the network according to the method of claim 1 where said second end system forms the customer-premises equipment of that claim; and passing from the intermediary system, over the network, to one said end system, the network address of the other said end system, and passing the network address of said one end system, from said one end system or said intermediary system to the said other end system whereby the end systems, knowing each others network addresses, can inter-communicate.

10. A method of initiating communication between a service system connected to an IP network at a known address, and customer-premises equipment connected to a telephone line to which other customer-premises apparatus may also be connected, the telephone line being part of a telephone system through which said equipment can connect to a network access point to access said IP network with an address that is assigned each time connection to the network is established, said method comprising:

initiating, from the service system, the sending of a wake-up indicator over said telephone line to the customer-premises equipment, the wakeup indicator being transmitted independently of a ringing telephone call;

monitoring said telephone line at the customer-premises equipment and upon detecting said wake-up indicator, accessing said IP network from the equipment by placing a telephone call through the telephone system to the network access point and establishing an IP link between the equipment and said network access point;

establishing contact from the customer premises equipment over the IP network with the service system at said known address; and passing from the customer-premises equipment to the service system, the current network address of said equipment, wherein the equipment and service system, knowing each others network addresses, can inter-communicate.

11. A method according to claim 10, wherein said wakeup indicator is a VMWI-based indicator.

12. A method of initiating communication over an IP network between a first end system and a second end system using the services of an intermediary service system connected to the network at a known address, at least the second of said end systems being connected to a telephone line that is part of a telephone system through which the second end system can connect to a network access point to access said network with an address that is assigned each time connection to the network is established, said method comprising:

passing from the first end system, over the network, to said intermediary system, a network address through which the first end system can be contacted, establishing contact between the intermediary system and the second end system over the network according to the method of claim 10 where said second end system forms the customer-premises equipment of that claim; and passing from the intermediary system, over the network, to one said end system, the network address of the other said end system, and passing the network address of said one end system, from said one end system or said intermediary system to the said other end system whereby the end systems, knowing each others network addresses, can inter-communicate.

13. A method of initiating communication between a service system connected to an IP network at a known address, and customer-premises equipment connected to a telephone line, the telephone line being part of a telephone system through which said equipment can connect to a network access point to access said IP network with an address that is assigned each time connection to the network is established, said method comprising:

initiating, from the service system, the sending of a wake-up indicator over a predetermined communications channel independent of said telephone line to the customer-premises equipment;

monitoring said predetermined channel at the customer-premises equipment and upon detecting said wake-up indicator, accessing said IP network from the equipment by placing a telephone call through the telephone system to the network access point and establishing an IP link between the equipment and said network access point;

establishing contact from the customer premises equipment over the IP network with the service system at said known address; and passing from the customer-premises equipment to the service system, the current network address of said equipment, wherein the equipment and service system, knowing each others network addresses, can inter-communicate.

14. A method according to claim 13, wherein said predetermined channel is a radio paging channel.

15. A method of initiating communication over an IP network between a first end system and a second end system using the services of an intermediary service system connected to the network at a known address, at least tie second of said end systems being connected to a telephone line that is part of a telephone system through which the second end system can connect to a network access point to access said network with an address that is assigned each time connection to the network is established, said method comprising:

passing from the first end system, over the network, to said intermediary system, a network address through which the first end system can be contacted, establishing contact between the intermediary system and the second end system over the network according to the method of claim 13 where said second end system forms the customer-premises equipment of that claim; and passing from the intermediary system, over the network, to one said end system, the network address of the other said end system, and passing the network address of said one end system, from said one end system or said intermediary system to the said other end system whereby the end systems, knowing each others network addresses, can inter-communicate.

* * * * *